US012696292B2

(12) United States Patent
Esswie

(10) Patent No.: US 12,696,292 B2
(45) Date of Patent: Jul. 28, 2026

(54) DISTRIBUTED DOWNLINK CONTROL CHANNEL DESIGN FOR WIRELESS TETHERED DEVICES

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 18/490,536

(22) Filed: Oct. 19, 2023

(65) Prior Publication Data

US 2025/0133571 A1 Apr. 24, 2025

(51) Int. Cl.
| | |
|---|---|
| *H04W 72/232* | (2023.01) |
| *H04L 1/00* | (2006.01) |
| *H04W 72/04* | (2023.01) |

(52) U.S. Cl.
CPC ......... *H04W 72/232* (2023.01); *H04L 1/0013* (2013.01); *H04W 72/04* (2013.01)

(58) Field of Classification Search
CPC .. H04W 72/232; H04W 72/04; H04L 1/0013; H04L 5/0094; H04L 5/0053
See application file for complete search history.

(56) References Cited

U.S. PATENT DOCUMENTS

2016/0050667 A1* 2/2016 Papasakellariou ...........................
H04W 74/0808
370/329
2018/0324848 A1 11/2018 Baghel et al.

(Continued)

FOREIGN PATENT DOCUMENTS

| CA | 3095199 A1 * | 4/2021 | .......... H04W 72/542 |
|---|---|---|---|
| EP | 4572525 A1 * | 6/2025 | ........ H04W 74/0808 |

(Continued)

OTHER PUBLICATIONS

"3rd Generation Partnership Project; Technical Specification Group Services and System Aspects; Release 17 Description; Summary of Rel-17 Work Items (Release 17)" 3GPP TR 21.917 V17.0.1, Jan. 2023, 167 pages.

(Continued)

*Primary Examiner* — Sujoy K Kundu
*Assistant Examiner* — Vladislav Y Agureyev
(74) *Attorney, Agent, or Firm* — Amin, Turocy & Watson, LLP

(57) ABSTRACT

An extended reality processing unit and one or more extended reality appliances may share a joint access code. The processing unit may transmit the access code and identifiers corresponding to the processing unit and the appliances to a radio access network node. The node may configure the processing unit and the appliances with respective control channel search space resources and respective scrambling codes corresponding thereto. The node may receive traffic directed to one of the appliances. If transmission of control channel information corresponding to the traffic would violate a latency criterion corresponding thereto, the node may puncture resources, configured for use by the processing unit, occurring during a joint search space occasion, to transmit the control channel information to the appliance. The node may determine a control information format that fits in remnant portions of the punctured joint search space occasion to deliver control information to the processing unit.

20 Claims, 17 Drawing Sheets

(56)                References Cited

U.S. PATENT DOCUMENTS

| | | | | |
|---|---|---|---|---|
| 2019/0021135 A1 | | 1/2019 | Jin et al. | |
| 2019/0098563 A1* | | 3/2019 | Bressanelli | H04W 36/305 |
| 2019/0363843 A1* | | 11/2019 | Gordaychik | H04W 28/16 |
| 2020/0021410 A1* | | 1/2020 | Choi | H04L 5/0044 |
| 2020/0044776 A1* | | 2/2020 | Guan | H04W 72/04 |
| 2020/0154404 A1* | | 5/2020 | Göktepe | H04L 1/1664 |
| 2020/0236579 A1* | | 7/2020 | Cho | H04W 24/10 |
| 2020/0314856 A1* | | 10/2020 | Bang | H04L 5/0094 |
| 2021/0051594 A1* | | 2/2021 | Chae | H04L 5/0055 |
| 2021/0105808 A1* | | 4/2021 | Lei | H04L 5/0051 |
| 2021/0235491 A1* | | 7/2021 | Iyer | H04W 74/0808 |
| 2021/0329724 A1* | | 10/2021 | Deenoo | H04W 72/046 |
| 2022/0006736 A1* | | 1/2022 | Lee | H04W 72/04 |
| 2022/0078650 A1* | | 3/2022 | Lee | H04W 24/08 |
| 2022/0095371 A1* | | 3/2022 | Oh | H04L 1/1854 |
| 2022/0124732 A1* | | 4/2022 | Park | H04W 72/20 |
| 2022/0264622 A1* | | 8/2022 | Lee | H04W 72/1268 |
| 2022/0287107 A1* | | 9/2022 | Kim | H04W 72/0446 |
| 2022/0361202 A1* | | 11/2022 | Yi | H04W 24/10 |
| 2023/0078557 A1* | | 3/2023 | Lee | H04W 52/14 |
| | | | | 370/318 |
| 2023/0189390 A1* | | 6/2023 | Park | H04W 76/28 |
| | | | | 370/252 |
| 2023/0353987 A1* | | 11/2023 | Babaei | H04L 5/0053 |
| 2023/0354329 A1* | | 11/2023 | Lee | H04L 5/0053 |
| 2024/0080833 A1* | | 3/2024 | Jeon | H04W 74/0833 |
| 2024/0187934 A1* | | 6/2024 | Yi | H04W 72/1263 |
| 2024/0224289 A1* | | 7/2024 | Lee | H04L 5/00 |
| 2024/0244638 A1* | | 7/2024 | Liu | H04W 48/12 |
| 2024/0267814 A1* | | 8/2024 | Kim | H04W 76/15 |
| 2024/0322978 A1* | | 9/2024 | Liu | H04L 5/0048 |
| 2024/0414708 A1* | | 12/2024 | Lee | H04W 72/1268 |
| 2025/0167954 A1* | | 5/2025 | Lim | H04B 7/0628 |
| 2025/0301282 A1* | | 9/2025 | Babaei | H04W 4/06 |

FOREIGN PATENT DOCUMENTS

| | | | | | |
|---|---|---|---|---|---|
| WO | WO-2018075472 A1 | * | 4/2018 | | H04W 72/23 |
| WO | WO-2018082387 A1 | * | 5/2018 | | H04W 72/23 |
| WO | WO-2022086736 A1 | * | 4/2022 | | H04W 4/06 |
| WO | WO-2022170159 A1 | * | 8/2022 | | H04W 52/0216 |
| WO | WO-2022192124 A1 | * | 9/2022 | | H04W 74/0833 |

OTHER PUBLICATIONS

International Search Report and Written Opinion for PCT Application No. PCT/US2024/013716 mailed Jul. 3, 2024, 18 pages.

Qualcomm Incorporated: "Proposed Updates to XR Device Categories", 3GPP Draft; AHVIC-201-PCR TS 26.928—XR-5G—Device Types—RI, vol. SA WG4, No. Telco; [http://www.3gpp.org/ftp/tsg_sa/WG4_COD EC/Ad-hoc_video_codec/Docs/AHVIC-201. zip], 2019, 5 pages.

Notification Concerning Transmittal of International Preliminary Report on Patentability for PCT Application No. PCT/US2024/013716 mailed Apr. 30, 2026, 11 pages.

European Office Action mailed May 27, 2026 for European Patent Application No. 24710937.4, 3 pages.

* cited by examiner

Joint access request

- Existing UCI/RRC information elements
- . .
- Novel joint access request information elements
- A capability indication or joint access code for joint control channel decoding, and/or
- One or more device IDs for joint control channel decoding (ID1, ID2, ...)

315

405

410

400

Figure 5:
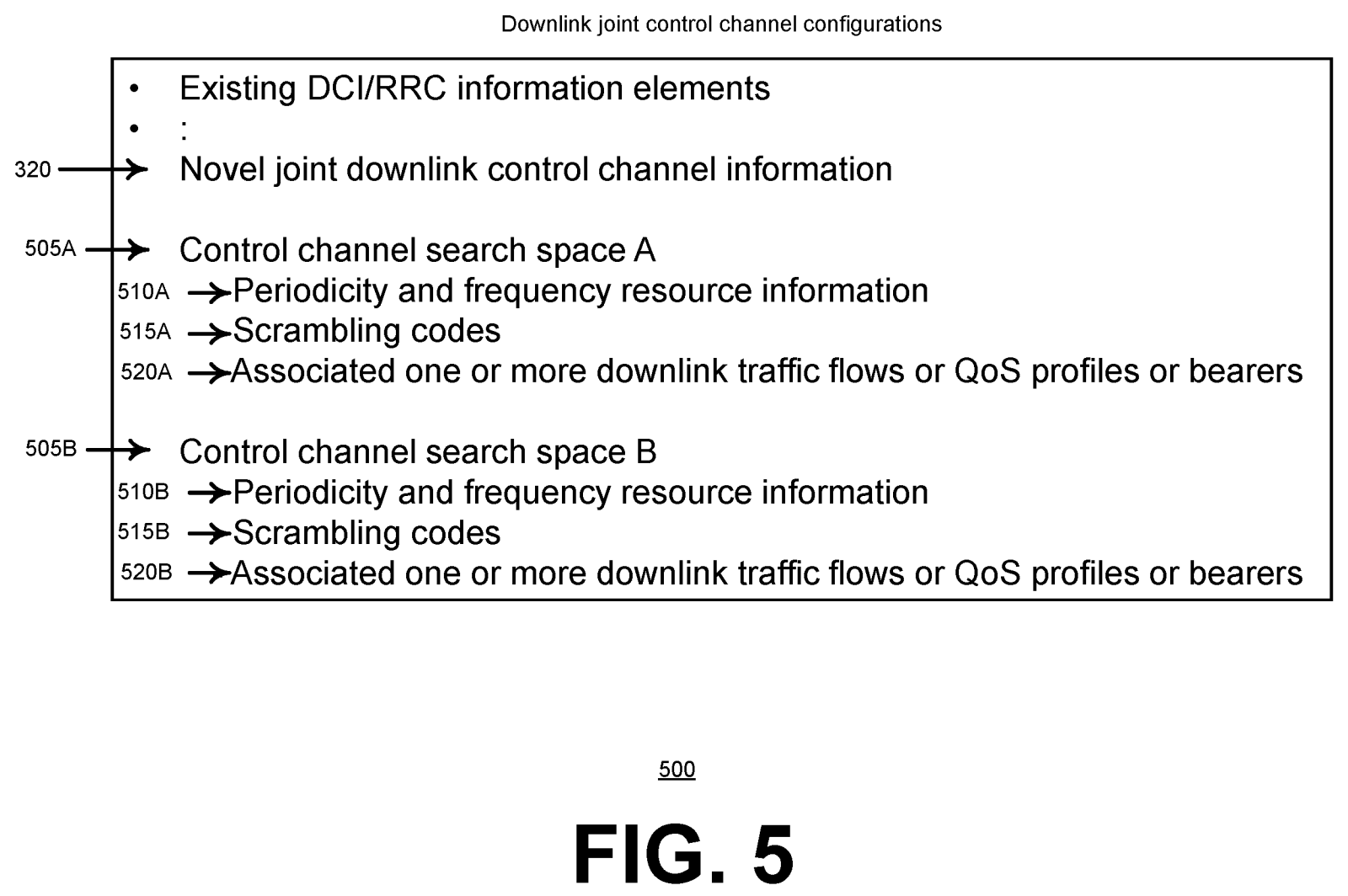

Downlink joint control channel configurations

• Existing DCI/RRC information elements
• . .
320 → Novel joint downlink control channel information 505A → Control channel search space A
510A → Periodicity and frequency resource information
515A → Scrambling codes
520A → Associated one or more downlink traffic flows or QoS profiles or bearers 505B → Control channel search space B
510B → Periodicity and frequency resource information
515B → Scrambling codes
520B → Associated one or more downlink traffic flows or QoS profiles or bearers

Figure 10:
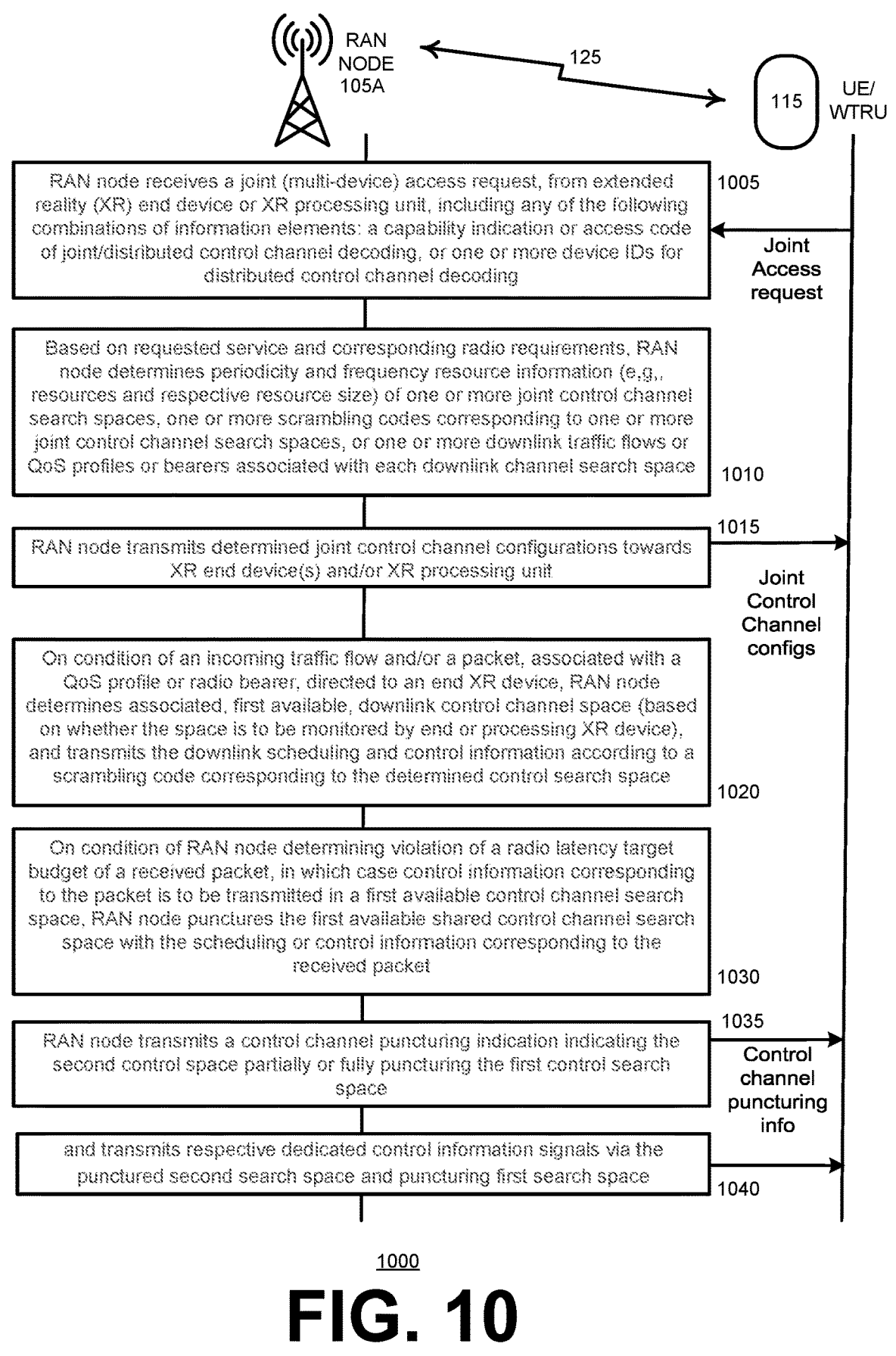

(((•))) RAN
NODE
105A

125

115  UE/
WTRU

RAN node receives a joint (multi-device) access request, from extended reality (XR) end device or XR processing unit, including any of the following combinations of information elements: a capability indication or access code of joint/distributed control channel decoding, or one or more device IDs for distributed control channel decoding    1005

Joint
Access
request

Based on requested service and corresponding radio requirements, RAN node determines periodicity and frequency resource information (e.g., resources and respective resource size) of one or more joint control channel search spaces, one or more scrambling codes corresponding to one or more joint control channel search spaces, or one or more downlink traffic flows or QoS profiles or bearers associated with each downlink channel search space    1010

RAN node transmits determined joint control channel configurations towards XR end device(s) and/or XR processing unit    1015

Joint
Control
Channel
configs

On condition of an incoming traffic flow and/or a packet, associated with a QoS profile or radio bearer, directed to an end XR device, RAN node determines associated, first available, downlink control channel space (based on whether the space is to be monitored by end or processing XR device), and transmits the downlink scheduling and control information according to a scrambling code corresponding to the determined control search space    1020

On condition of RAN node determining violation of a radio latency target budget of a received packet, in which case control information corresponding to the packet is to be transmitted in a first available control channel search space, RAN node punctures the first available shared control channel search space with the scheduling or control information corresponding to the received packet    1030

RAN node transmits a control channel puncturing indication indicating the second control space partially or fully puncturing the first control search space    1035

Control
channel
puncturing
info and transmits respective dedicated control information signals via the punctured second search space and puncturing first search space    1040

Figure 11:
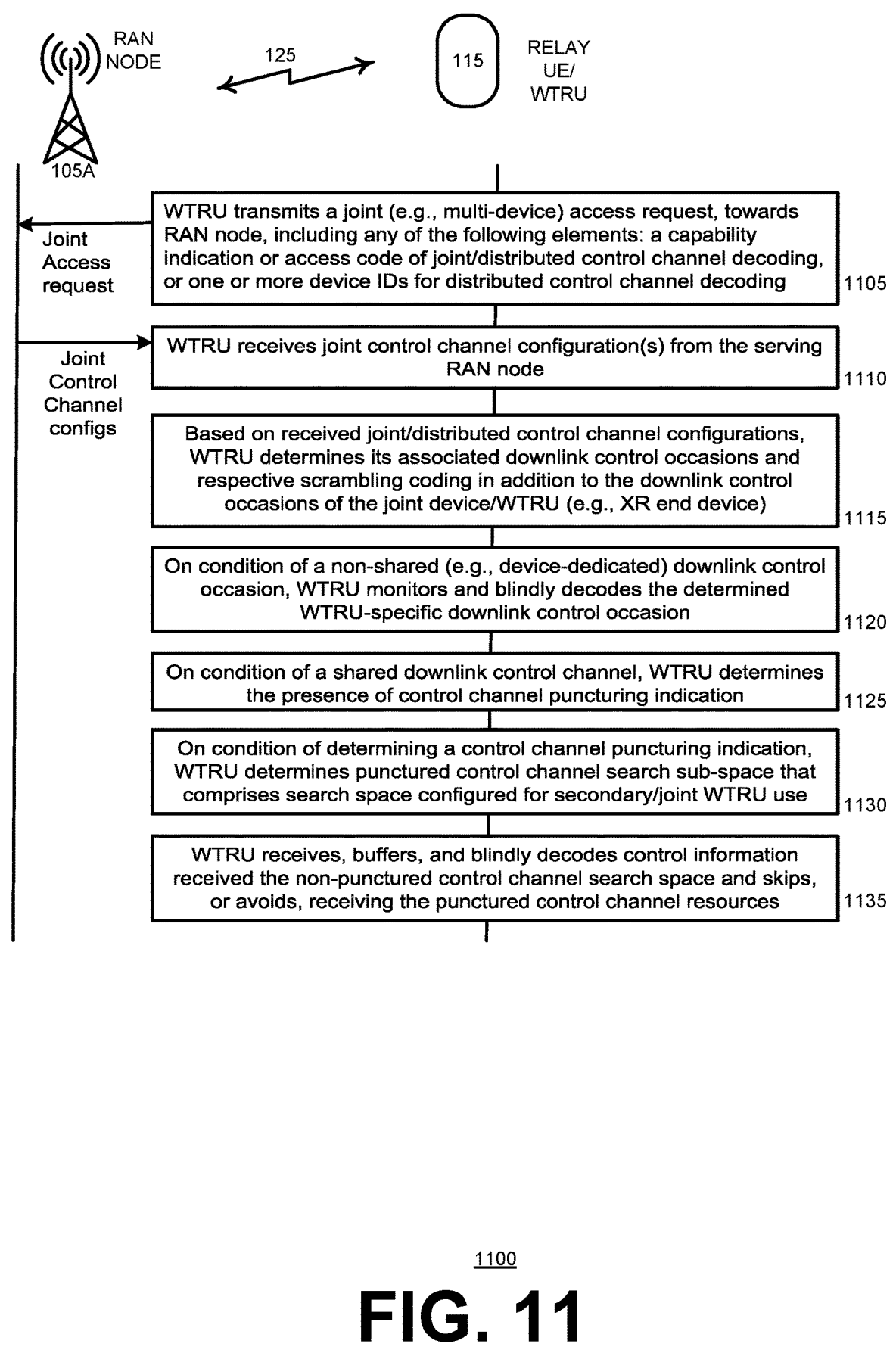

((ᵢ)) RAN NODE    ←‒ 125 ‒→    115   RELAY UE/ WTRU

105A

Joint Access request

| WTRU transmits a joint (e.g., multi-device) access request, towards RAN node, including any of the following elements: a capability indication or access code of joint/distributed control channel decoding, or one or more device IDs for distributed control channel decoding | 1105 |

Joint Control Channel configs

| WTRU receives joint control channel configuration(s) from the serving RAN node | 1110 |

| Based on received joint/distributed control channel configurations, WTRU determines its associated downlink control occasions and respective scrambling coding in addition to the downlink control occasions of the joint device/WTRU (e.g., XR end device) | 1115 |

| On condition of a non-shared (e.g., device-dedicated) downlink control occasion, WTRU monitors and blindly decodes the determined WTRU-specific downlink control occasion | 1120 |

| On condition of a shared downlink control channel, WTRU determines the presence of control channel puncturing indication | 1125 |

| On condition of determining a control channel puncturing indication, WTRU determines punctured control channel search sub-space that comprises search space configured for secondary/joint WTRU use | 1130 |

| WTRU receives, buffers, and blindly decodes control information received the non-punctured control channel search space and skips, or avoids, receiving the punctured control channel resources | 1135 |

Figure 13:
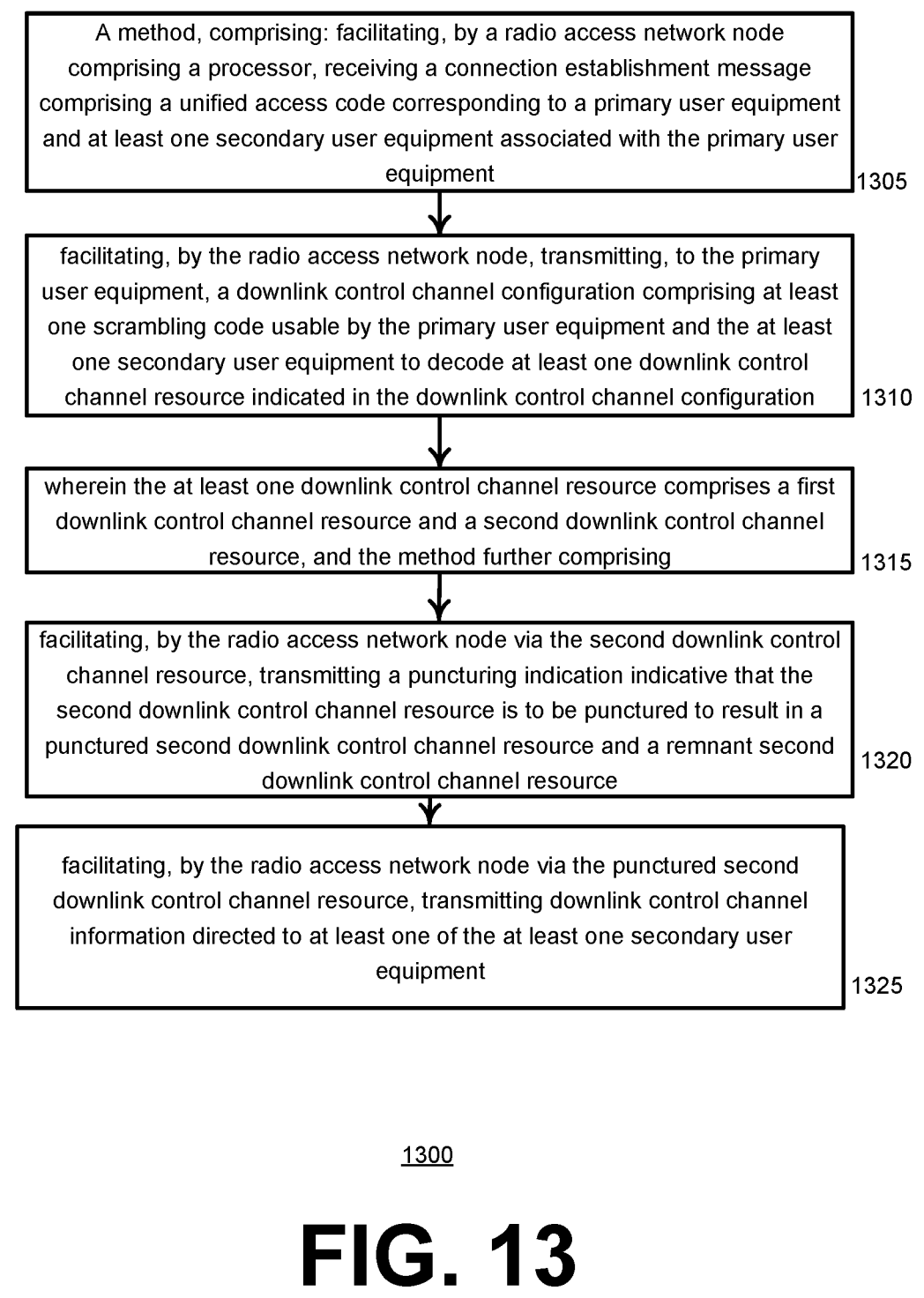

A method, comprising: facilitating, by a radio access network node comprising a processor, receiving a connection establishment message comprising a unified access code corresponding to a primary user equipment and at least one secondary user equipment associated with the primary user equipment — 1305

↓ facilitating, by the radio access network node, transmitting, to the primary user equipment, a downlink control channel configuration comprising at least one scrambling code usable by the primary user equipment and the at least one secondary user equipment to decode at least one downlink control channel resource indicated in the downlink control channel configuration — 1310

↓ wherein the at least one downlink control channel resource comprises a first downlink control channel resource and a second downlink control channel resource, and the method further comprising — 1315

↓ facilitating, by the radio access network node via the second downlink control channel resource, transmitting a puncturing indication indicative that the second downlink control channel resource is to be punctured to result in a punctured second downlink control channel resource and a remnant second downlink control channel resource — 1320

↓ facilitating, by the radio access network node via the punctured second downlink control channel resource, transmitting downlink control channel information directed to at least one of the at least one secondary user equipment — 1325

Figure 14:
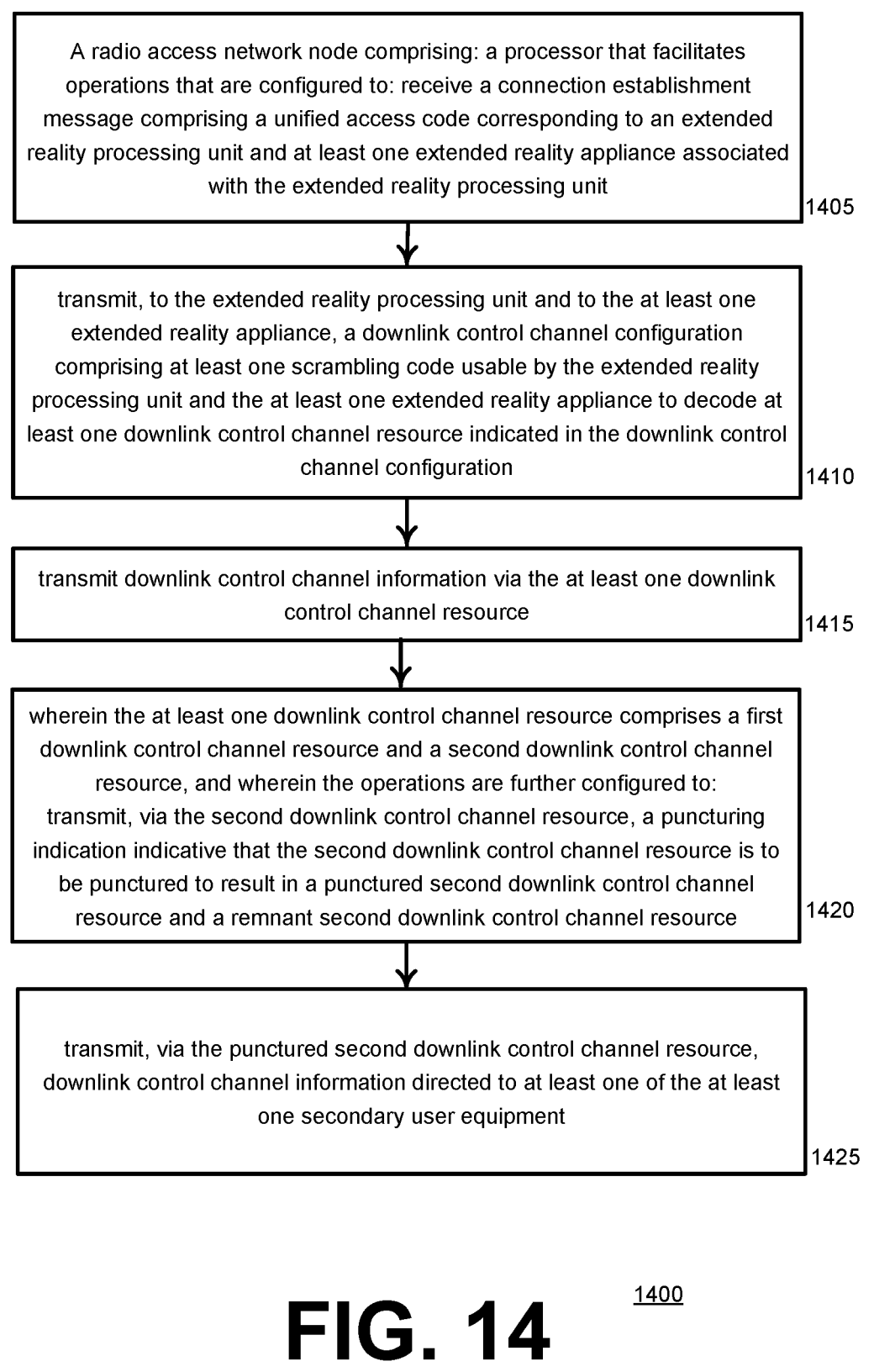

A radio access network node comprising: a processor that facilitates operations that are configured to: receive a connection establishment message comprising a unified access code corresponding to an extended reality processing unit and at least one extended reality appliance associated with the extended reality processing unit

1405 transmit, to the extended reality processing unit and to the at least one extended reality appliance, a downlink control channel configuration comprising at least one scrambling code usable by the extended reality processing unit and the at least one extended reality appliance to decode at least one downlink control channel resource indicated in the downlink control channel configuration

1410 transmit downlink control channel information via the at least one downlink control channel resource

1415 wherein the at least one downlink control channel resource comprises a first downlink control channel resource and a second downlink control channel resource, and wherein the operations are further configured to: transmit, via the second downlink control channel resource, a puncturing indication indicative that the second downlink control channel resource is to be punctured to result in a punctured second downlink control channel resource and a remnant second downlink control channel resource

1420 transmit, via the punctured second downlink control channel resource, downlink control channel information directed to at least one of the at least one secondary user equipment

Figure 15:
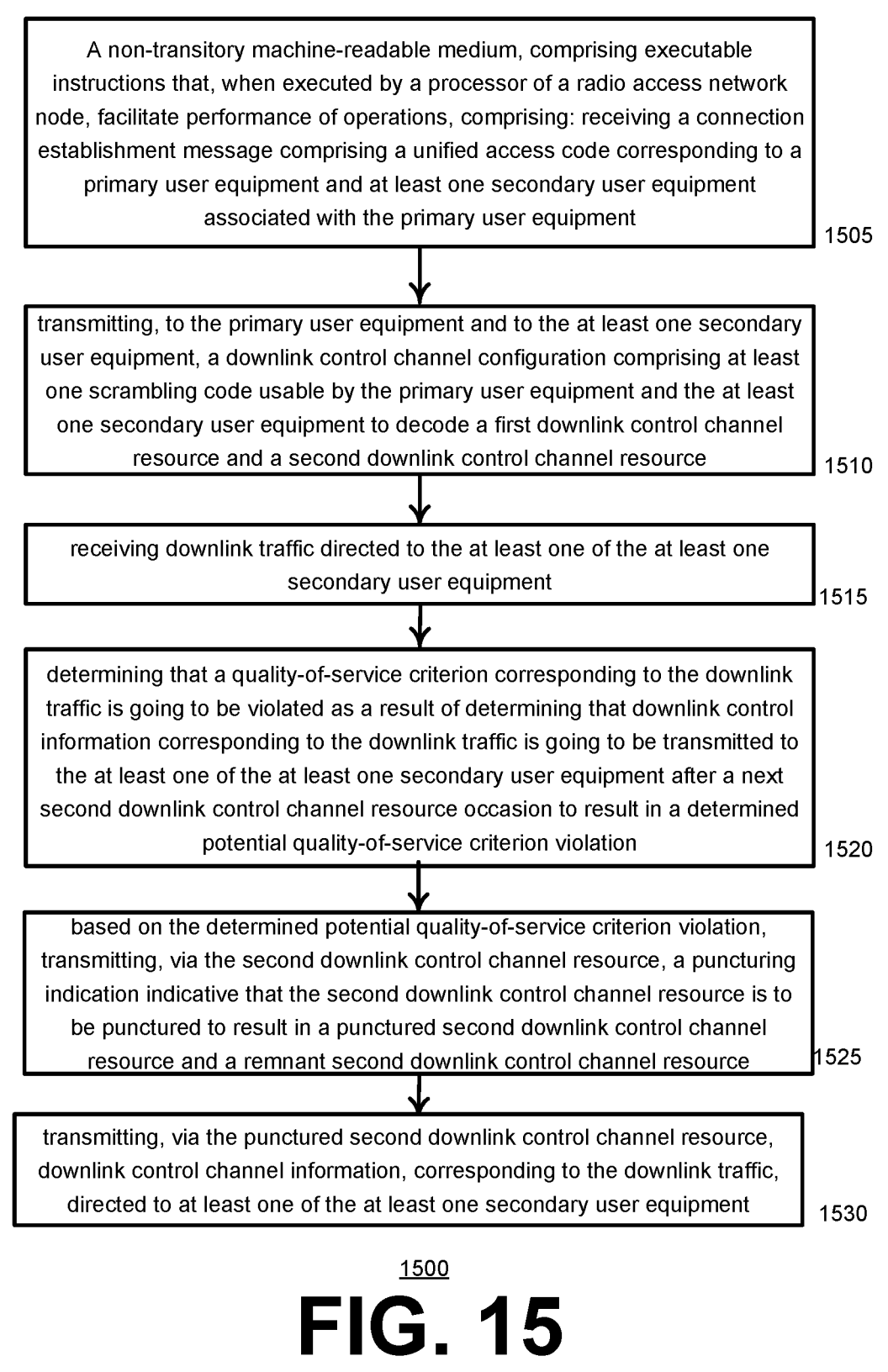

A non-transitory machine-readable medium, comprising executable instructions that, when executed by a processor of a radio access network node, facilitate performance of operations, comprising: receiving a connection establishment message comprising a unified access code corresponding to a primary user equipment and at least one secondary user equipment associated with the primary user equipment

1505 transmitting, to the primary user equipment and to the at least one secondary user equipment, a downlink control channel configuration comprising at least one scrambling code usable by the primary user equipment and the at least one secondary user equipment to decode a first downlink control channel resource and a second downlink control channel resource

1510 receiving downlink traffic directed to the at least one of the at least one secondary user equipment

1515 determining that a quality-of-service criterion corresponding to the downlink traffic is going to be violated as a result of determining that downlink control information corresponding to the downlink traffic is going to be transmitted to the at least one of the at least one secondary user equipment after a next second downlink control channel resource occasion to result in a determined potential quality-of-service criterion violation

1520 based on the determined potential quality-of-service criterion violation, transmitting, via the second downlink control channel resource, a puncturing indication indicative that the second downlink control channel resource is to be punctured to result in a punctured second downlink control channel resource and a remnant second downlink control channel resource

1525 transmitting, via the punctured second downlink control channel resource, downlink control channel information, corresponding to the downlink traffic, directed to at least one of the at least one secondary user equipment

DISTRIBUTED DOWNLINK CONTROL CHANNEL DESIGN FOR WIRELESS TETHERED DEVICES

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, receiving a connection establishment message comprising a unified access code corresponding to a primary user equipment and at least one secondary user equipment associated with the primary user equipment; and facilitating, by the radio access network node, transmitting, to the primary user equipment, a downlink control channel configuration comprising at least one scrambling code usable by the primary user equipment and the at least one secondary user equipment to decode at least one downlink control channel resource indicated in the downlink control channel configuration. The primary user equipment may comprise an extended reality processing unit and the secondary user equipment may comprise an end extended reality appliance. The method may further comprise facilitating, by the radio access network node, transmitting, to the at least one secondary user equipment, the downlink control channel configuration.

In an embodiment, the at least one downlink control channel resource may comprise a first downlink control channel resource and a second downlink control channel resource. The at least one scrambling code may comprise a first scrambling code and a second scrambling code corresponding, respectively, to the first downlink control channel resource and the second downlink control channel resource. The first scrambling code may be usable by the primary user equipment and the at least one secondary user equipment to decode the first downlink control channel resource.

In an embodiment, the at least one downlink control channel resource may comprise a first downlink control channel resource and a second downlink control channel resource. The method may further comprise facilitating, by the radio access network node via the second downlink control channel resource, transmitting a puncturing indication indicative that the second downlink control channel resource is to be punctured to result in a punctured second downlink control channel resource and a remnant second downlink control channel resource. The method may further comprise facilitating, by the radio access network node via the punctured second downlink control channel resource, transmitting downlink control channel information directed to at least one of the at least one secondary user equipment.

The puncturing indication may comprise an indication that the second downlink control channel resource is to be punctured by the first downlink control channel resource to result in the punctured second downlink control channel resource and the first downlink control channel resource being the same, at least with respect to frequency and time. The puncturing indication may comprise a puncturing resource indication indicative of the punctured second downlink control channel resource. In an embodiment, the punctured second downlink control channel resource and the first downlink control channel resource may be different.

In an embodiment, the at least one scrambling code may comprise a first scrambling code and a second scrambling code corresponding, respectively, to the first downlink control channel resource and the second downlink control channel resource. The first scrambling code may be usable by the primary user equipment and the at least one secondary user equipment to decode the first downlink control channel resource. The second scrambling code may be usable by the primary user equipment to decode the second downlink control channel resource. The first scrambling code may be usable by the at least one of the at least one secondary user equipment to decode the punctured second downlink control channel resource. The second scrambling code may be exclusively usable by the primary user equipment to decode the second downlink control channel resource. The second scrambling code may be usable by the primary user equipment and the at least one secondary user equipment to decode the puncturing indication.

In an embodiment, the at least one scrambling code may comprise a same scrambling code usable by the primary user equipment and the at least one secondary user equipment to decode the first downlink control channel resource and the second downlink control channel resource.

In an embodiment, the second downlink control channel resource may be a next second downlink control channel resource occasion. The method may further comprise facilitating, by the radio access network node, receiving downlink traffic directed to the at least one of the at least one secondary user equipment. The method may further comprise determining that a quality-of-service criterion corresponding to the downlink traffic will be violated as a result of transmission of downlink control information corresponding to the downlink traffic to the at least one of the at least one secondary user equipment after the next second downlink control channel resource occasion, the determining resulting in a determined potential quality-of-service criterion violation. The transmitting of the puncturing indication may be based on the determined potential quality-of-service criterion violation.

In an embodiment, the method may further comprise, based on the remnant second downlink control channel resource, determining, by the radio access network node, a control channel message format that is able to be transmitted to the primary user equipment via the remnant second downlink control channel resource, and facilitating, by the radio access network node, transmitting downlink control channel information directed to the primary user equipment according to the control channel message format via the remnant second downlink control channel resource.

The downlink control channel information may comprise first downlink control information and second downlink control information. The control channel message format may comprise at least one first information format segment and at least one second information format segment. The remnant second downlink control channel resource may comprise a first remnant portion and a second remnant portion. The first downlink control information may be transmitted according to the at least one first information formant segment via the first remnant portion and the second downlink control information may be transmitted according to the at least one second information format segment via the second remnant portion.

In another example embodiment, a radio access network node may comprise a processor that facilitates operations that are configured to receive a connection establishment message comprising a unified access code corresponding to an extended reality processing unit and at least one extended reality appliance associated with the extended reality processing unit. The operations may be further configured to transmit, to the extended reality processing unit and to the at least one extended reality appliance, a downlink control channel configuration comprising at least one scrambling code usable by the extended reality processing unit and the at least one extended reality appliance to decode at least one downlink control channel resource indicated in the downlink control channel configuration. The operations may be further configured to transmit downlink control channel information via the at least one downlink control channel resource.

The at least one downlink control channel resource may comprise a first downlink control channel resource and a second downlink control channel resource. The operations may be further configured to transmit, via the second downlink control channel resource, a puncturing indication indicative that the second downlink control channel resource is to be punctured to result in a punctured second downlink control channel resource and a remnant second downlink control channel resource. The operations may be further configured to transmit, via the punctured second downlink control channel resource, downlink control channel information directed to at least one of the at least one secondary user equipment.

The second downlink control channel resource to be punctured may be a first second downlink control channel occasion. A second second downlink control channel resource may be a next second downlink control channel occasion with respect to the first second downlink control channel occasion. The operations may be further configured to receive downlink traffic directed to the at least one of the at least one secondary user equipment. The operations may be further configured to determine that a quality-of-service criterion corresponding to the downlink traffic will be violated, resulting in a determined potential quality-of-service criterion violation, based on a determination that downlink control information corresponding to the downlink traffic will be transmitted to the at least one of the at least one secondary user equipment after the next second downlink control channel resource occasion. The puncturing indication may be transmitted based on the determined potential quality-of-service criterion violation, and wherein the downlink control channel information corresponds to the downlink traffic.

In yet another example embodiment, a non-transitory machine-readable medium may comprise executable instructions that, when executed by a processor of a radio access network node, may facilitate performance of operations, comprising receiving a connection establishment message comprising a unified access code corresponding to a primary user equipment and at least one secondary user equipment associated with the primary user equipment. The operations may further comprise transmitting, to the primary user equipment and to the at least one secondary user equipment, a downlink control channel configuration comprising at least one scrambling code usable by the primary user equipment and the at least one secondary user equipment to decode a first downlink control channel resource and a second downlink control channel resource. The operations may further comprise receiving downlink traffic directed to the at least one of the at least one secondary user equipment. The operations may further comprise determining that a quality-of-service criterion corresponding to the downlink traffic is going to be violated as a result of determining that downlink control information corresponding to the downlink traffic may likely be transmitted to the at least one of the at least one secondary user equipment after a next second downlink control channel resource occasion to result in a determined potential quality-of-service criterion violation. Based on the determined potential quality-of-service criterion violation, the operations may further comprise transmitting, via the second downlink control channel resource, a puncturing indication indicative that the second downlink control channel resource is to be punctured to result in a punctured second downlink control channel resource and a remnant second downlink control channel resource, and transmitting, via the punctured second downlink control channel resource, downlink control channel information, corresponding to the downlink traffic, directed to at least one of the at least one secondary user equipment.

Based on the remnant second downlink control channel resource, the operations may further comprise determining a control channel message format that is able to be transmitted to the primary user equipment via the remnant second downlink control channel resource, and transmitting downlink control channel information directed to the primary user equipment according to the control channel message format via the remnant second downlink control channel resource. The downlink control channel information may comprise first downlink control information and second downlink control information. The control channel message format may comprise at least one first information format segment and at least one second information format segment. The remnant second downlink control channel resource may comprise a first remnant portion and a second remnant portion. The first downlink control information may be transmitted according to the at least one first information format segment via the first remnant portion and the second downlink control information may be transmitted according to the at least one second information formant segment via the second remnant portion.

In an embodiment, the control channel message format may be a revised control channel message format that is configured to accommodate less control information than a default control channel message format. The second downlink control channel resource may be configured to accommodate transmission of control information according to the default control channel message format and the remnant second downlink control channel resource may be unable to accommodate transmission of control information according to the default control channel message format.

BRIEF DESCRIPTION OF THE DRAWINGS

FIG. 5 illustrates an example message comprising downlink joint control channel configuration information.

FIG. 10 illustrates a timing diagram of an example embodiment.

FIG. 11 illustrates a timing diagram of another example embodiment.

FIG. 13 illustrates a block diagram of an example method embodiment.

FIG. 14 illustrates a block diagram of an example radio access network node embodiment.

FIG. 15 illustrates a block diagram of an example non-transitory machine-readable medium embodiment.

DETAILED DESCRIPTION OF THE DRAWINGS

Figure 1:
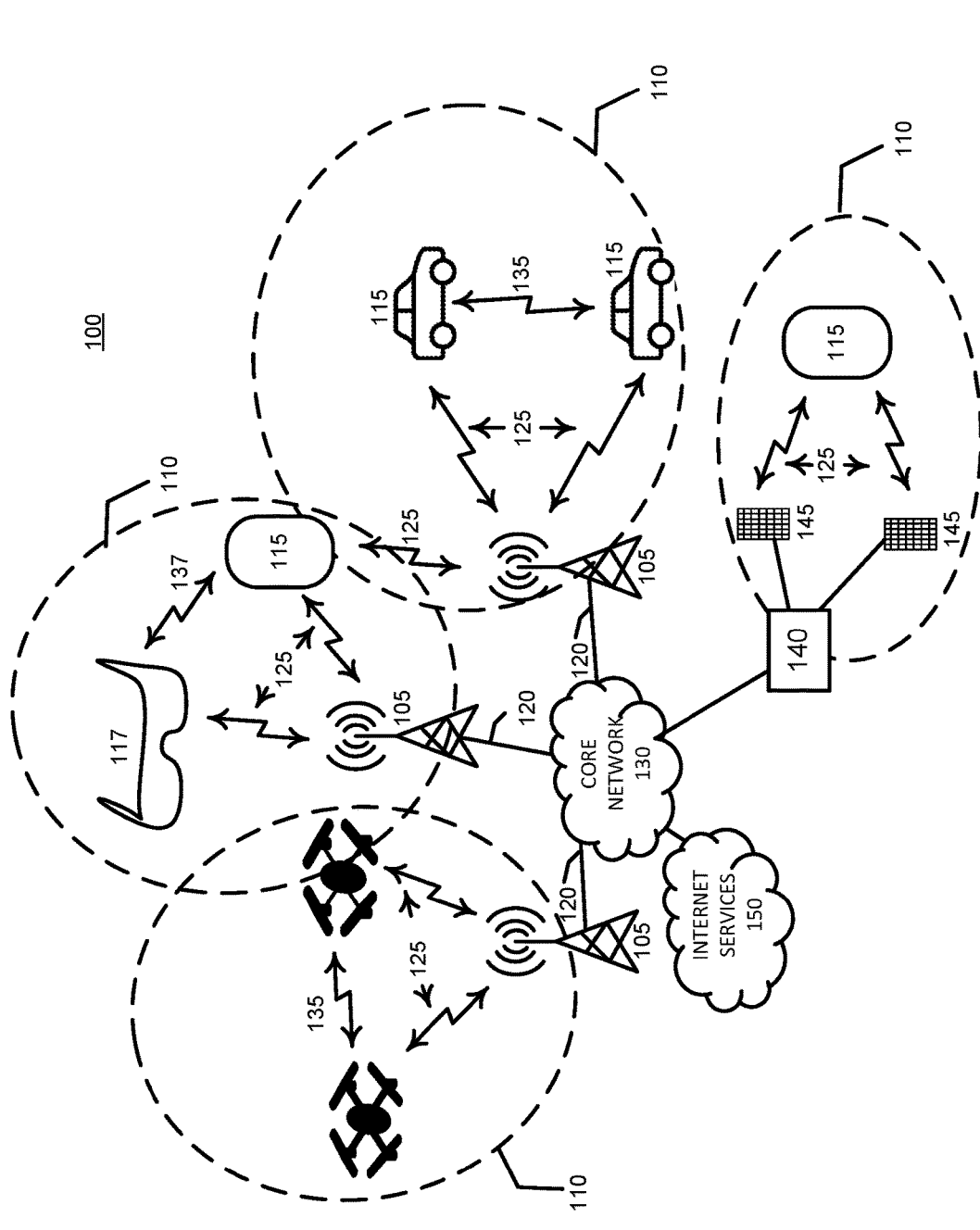
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR service may be referred to as anything reality services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 16.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management entity (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors.

The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
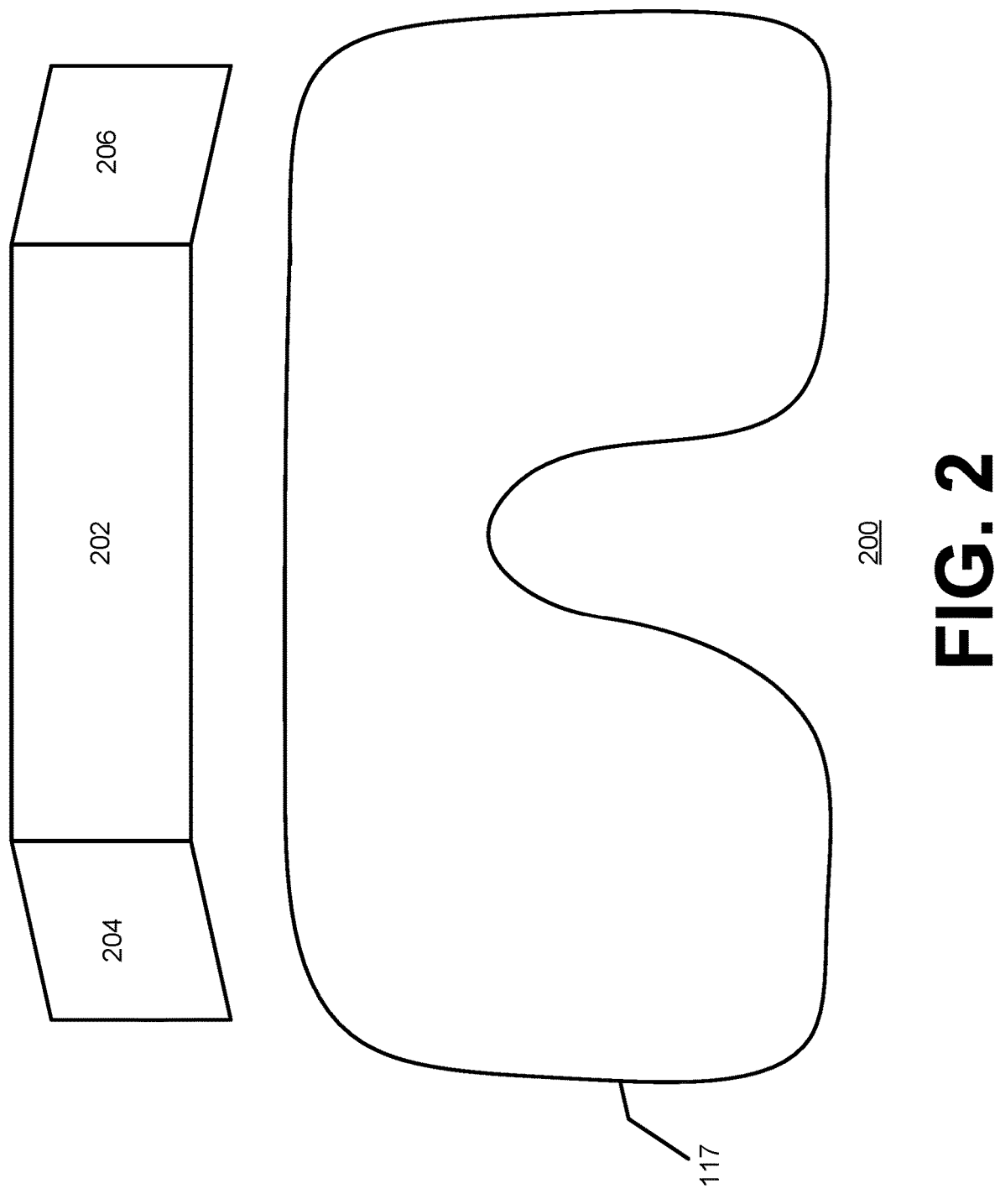
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames require, broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

As diverse XR services, including VR, AR, and MR proliferate, radio optimization techniques to facilitate the very high network capacity that the applications require are desirable. Such requirements may be the result of increases in streaming of ultra-high-capacity video content, which may facilitate immersive XR user experiences, that may lead to an enormous amount of traffic corresponding to an XR session being delivered with an ultra-high capacity and low latency budget. Such large amounts of traffic coupled with stringent capacity and latency budget criteria may result in a degraded overall network spectral efficiency due to a RAN node supporting the stringent XR requirements only for a small number of user equipment while traffic to other user equipment may be blocked or throttled.

Multi-modal XR applications integrate the different technologies to offer a versatile and comprehensive user experience. For example, a multi-modal XR application might use VR to immerse users in a virtual training environment and then seamlessly switch to AR or MR to provide real-time feedback or overlay instructional information on physical objects. One of the primary advantages of multi-modal XR applications is the adaptability to different contexts and user preferences. Multi-modal application can provide varying levels of immersion and interaction, allowing users to choose the most suitable mode of engagement based on their needs or the specific task at hand. Additionally, multi-modal XR can enable collaborative experiences, allowing users in different physical locations to interact within the same virtual space. Moreover, the potential applications of multi-modal XR extend beyond entertainment and gaming, with widespread adoption in fields such as healthcare, education, engineering, and marketing. Medical practitioners can use multi-modal XR to simulate complex surgeries, educators can create interactive and immersive learning experiences, and architects can visualize and modify building designs in real-time.

Due to stringent requirements corresponding to XR applications, such as, for example, capacity requirements, latency requirements, and reliability requirements, wherein improvement in one may exacerbate or degr4ade another, support of XR services via cellular communications has been deemed challenging and costly in terms of sacrificed spectral efficiency and energy consumption at RAN nodes and at XR devices. For example, to satisfy capacity and video rendering requirements of many XR applications, advanced multi-antenna system, sophisticated processing and large battery capacities may be adopted at XR end device appliances. This may increase the weight of an end XR device (e.g., an XR glass, helmet, bracelet, etc.), increase heating at the XR appliance, which may pose a safety concern due to proximity to a user's brain, and decrease aesthetics of an XR appliance.

Thus, a novel XR deployment model using one or more middle (e.g., intermediate between a RAN node and an end XR appliance) and highly capable XR processing unit(s), which may comprise similar equipment as user equipment 115 and which may be referred to herein as a user equipment, can comprise a generic XR processing device supplied by a third party or may be a proprietary in-box XR-supporting user equipment device, and may be adopted to handle various tasks that would otherwise be performed by an end XR user equipment appliance and to reduce size, weight, heating, battery consumption of an XR appliance while resulting in a more aesthetically pleasing XR appliance. An intermediate XR processing unit may relay all or part of XR traffic between an end XR appliance/device and a serving RAN node. Thus, an intermediate XR processing unit may effectively relax, or reduce, radio aspect processing burdens away from a low-capability, light, and aesthetically pleasing end XR device. Radio traffic processing burdens that may be facilitated by an intermediate XR processing unit and that may be taken over from an end XR appliance may comprise local traffic storage, processing-heavy control channel decoding, local XR video rendering, and advanced radio antenna manipulation/implementation. Thus, advanced receiver and processing capability for critical XR services may be facilitated while maintaining a light, pleasant-looking, and efficient end XR device/appliance. Moreover, an intermediate XR processing unit can further assist a serving RAN node in reducing network-side processing and signalling overhead that may limit commercial success of XR services deployment that typically require significant RAN node processing and control channel overhead.

However, due to various and stringent QoS requirements of different XR traffic flows, it may be necessary that some latency-critical control information (e.g., scheduling and resource grant information, or re-transmission configurations) corresponding to latency-critical XR traffic flows be directly exchanged between a RAN node and an end XR device instead of a 5G-modem-equipped middle XR processing unit being a go-between with respect to the RAN node and the end XR appliance to avoid additional inter-XR-device delay. Accordingly, embodiments disclosed herein may facilitate distributed control channel design, where control information may be dynamically split among both XR devices depending scheduled traffic criticality (e.g., maximum allowable latency budgets). Embodiments disclosed herein may comprise novel distributed downlink control channel design, novel split radio signaling procedures, and novel RAN node/device decoding actions. Control channel design embodiments disclosed herein may facilitate dynamic splitting of downlink control information among one or more low-capability end XR appliance(s) and a central XR processing unit. Thus, performance benefits achievable by using a middle/central XR processing unit (e.g., a generic XR device, a laptop, a smartphone, and the like) due to relaxing, or offloading, various radio operations, including traffic processing, signaling, and battery consumption loading from the low capability end XR device are preserved while stringent latency requirements of critical XR traffic flows are satisfied. The performance benefits of using an XR processing unit may be achieved by facilitating delivery of less-critical traffic using an XR processing unit and satisfaction of latency-critical traffic may be maintained by direct delivery from a serving RAN node to an end XR appliance. To facilitate the use of an XR processing unit and direct delivery of critical traffic, embodiments disclosed herein may comprise capability to adaptively split control information among different devices and dynamic control channel puncturing procedures. The dynamic puncturing procedures may comprise a control channel search space corresponding to a device (e.g., control channel search space resource(s) corresponding to, or assigned to, an XR processing unit) being dynamically punctured, partially or fully, by control channel information corresponding to another device, for example an end XR appliance, wherein traffic directed to the end XR appliance is more delay-stringent (e.g., about to violate a maximum allowable latency budget corresponding to the end XR appliance traffic). Embodiments disclosed herein may comprise novel radio signaling procedures to carry control channel puncturing information, and novel actions/decoding behaviors at end XR appliances and serving RAN nodes.

To minimize inter-XR device communication delay (e.g., delay resulting from communication between an XR processing unit and an end XR appliance), which may cause violation of a stringent latency target corresponding to a latency critical traffic flow, embodiments disclosed herein may facilitate adaptive downlink links, from a serving RAN node towards the intermediate XR processing unit or one or more end XR appliances, such that traffic associated with latency-critical flows is directly scheduled and transmitted from the RAN node to the end XR appliance(s) while other less-latency-stringent flows can be delivered to the XR processing unit for forwarding to the end XR appliance(s). In an embodiment may implement splitting delivery of control information.

Joint Multi-Device Network Access Using a Unified Access Code or Indication

A unified access code disclosed herein may facilitate multiple connection establishment requests (from multiple user equipment including XR processing unit(s) and end XR appliance(s)), being treated by a serving RAN node as a single downlink connection establishment (though, for multiple devices) for access requests corresponding to the same access code indicating the same access/pairing code.

Control Channel Setup

Based on the multi-device joint connection access embodiments disclosed herein, a control channel resource granted by a RAN node may be only associated with a single scrambling code, despite the access code being usable for indicating monitoring and decoding by multiple user equipment devices. Design, content, and setup of a control channel search space may be changed dynamically and on demand basis. The search space may be changed based on a device (e.g., XR processing unit, or end XR appliance) to which control information contained in the search space is directed.

Novel RAN node behaviors facilitated by embodiments disclosed herein may comprise: treating multiple devices as one connection through use of a single scrambling code for decoding downlink control channels (e.g., multi-device joint connection); dynamically determining and performing control channel puncturing; or determining and segmenting control channel messages to 'fit' within the non-punctured control search subspace.

Novel XR device (e.g., XR processing unit or end XR appliance(s)) behaviors facilitated by embodiments disclosed herein may comprise: joint network access with a unified access code or indication; receiving, buffering, combining, or decoding received control channel messages over non punctured control channel subspaces, or dynamically activating, receiving, or decoding puncturing control subspaces triggered by a puncturing indication.

Embodiments disclosed herein may comprise a novel distributed control channel design and dynamic control channel puncturing, novel transmission behaviors of a serving RAN node, and novel control channel decoding actions of user equipment devices. Embodiments disclosed herein may comprise an XR processing unit and end XR appliances being configured (e.g., based on device manufacturer hard coding or based on being dynamically coordinated among the devices) with a joint access code and/or indication, that the processing unit and appliance(s) devices may adopt when establishing a connection towards the RAN node. Such a unified access code may facilitate the RAN node treating the multiple user equipment device (e.g., one central XR processing unit and one or more end XR devices) effectively as a single device since the XR processing unit may coordinating radio operations and relaying of traffic for in-proximity end XR appliances. For initial connection establishment, in an embodiment, more than one user equipment may trigger connection establishment procedures towards the RAN node by indicating the novel unified access code or indication thereof. In another embodiment, wherein the XR processing unit may be facilitating establishing an aggregate connection towards the RAN node (while end XR appliances stay idle), the processing unit may indicate one or more device identifiers corresponding to the connected end XR device(s) that are associated with the unified access code as part of the processing unit's RRC connection establishment signaling. The RAN node may identify that the multiple connection requests corresponding to multiple end XR appliances belong to the same XR session, with the central XR processing unit performing most of the radio operations on behalf of the one or more end XR devices. Based on an identified XR service identified in a joint access request and traffic characteristics of the yet-to-be established XR session corresponding thereto, the RAN node may determine resource configurations (e.g., timing and frequency resources as well periodicity) of a primary control channel search space (the term 'primary' may be used to indicate that the primary resources correspond to the XR processing unit but the primary search space resources may be referred to herein as second control channel search space resources) and one or more secondary control channel search spaces (that correspond to the end XR appliance(s) and that may be referred to herein as first search space resources), with secondary resources overlapping (in time and frequency with the primary search space to reduce the total control channel overhead), and the corresponding decoding configuration of each search space (e.g., scrambling codes).

In an embodiment, the primary, and larger, control search space may be always monitored by the central XR processing unit to decode and capture the majority of the downlink control information directed towards itself or to any of the connected end XR devices, while the smaller one or more secondary search spaces may be monitored on an on-demand basis and may be decoded by any of the connected end XR devices. The smaller secondary search spaces may facilitate timely delivery of traffic received by a RAN node that comprises very latency-stringent payload and that must be delivered to any of the active end XR device within a highly stringent latency budget. Accordingly, the RAN node may immediately, and on-demand, schedule the received payload directly to the end XR device during a first available secondary control channel search space, monitored by the intended end XR device, thus avoiding additional delay of relaying control information and/or XR payload from the central XR processing unit towards intended end XR appliance, but potentially at the expense of an increased processing and decoding load on the end XR appliance. To facilitate the delivery of control information during a first available secondary control channel search space, the RAN node may puncture the preconfigured primary control search space resource occasion with any of the available secondary search space resources. Thus, in an embodiment, a RAN node may compile and transmit a control channel puncturing indication, prior to each primary control search space occasion, or at the beginning thereof. The RAN node may determine a control channel information message format that fits within the remaining/remnant non-punctured primary search space size. The RAN node may segment determined control messages to be directed to the central XR processing unit such that each segment is transmitted within a non-punctured area, or portion, of the primary control search space. Upon detecting a present puncturing indication, the central XR processing unit, which may be configured to decode the entire primary search space for extracting its own control information and XR end devices' control information, may alter its control channel decoding behavior due to such partial puncturing of the primary search space. That is, the XR processing unit may receive, buffer, combine, and finally decode the received one or more control message segments over the non-punctured resource sets of the primary control search space. From the perspective of an end XR appliance, and upon detecting a present puncturing indication, an end XR appliance may act as an activation of local control channel monitoring, and accordingly may monitor and attempt blindly decoding one or more secondary search space resource occasions that may be puncturing the primary search space. Using embodiments disclosed herein, heavy processing load may be handled by the central XR processing unit while latency critical control information may be dynamically, on an on-demand basis, decoded at the end XR appliances without the latency-critical traffic passing through the central XR processing unit.

Figure 3:
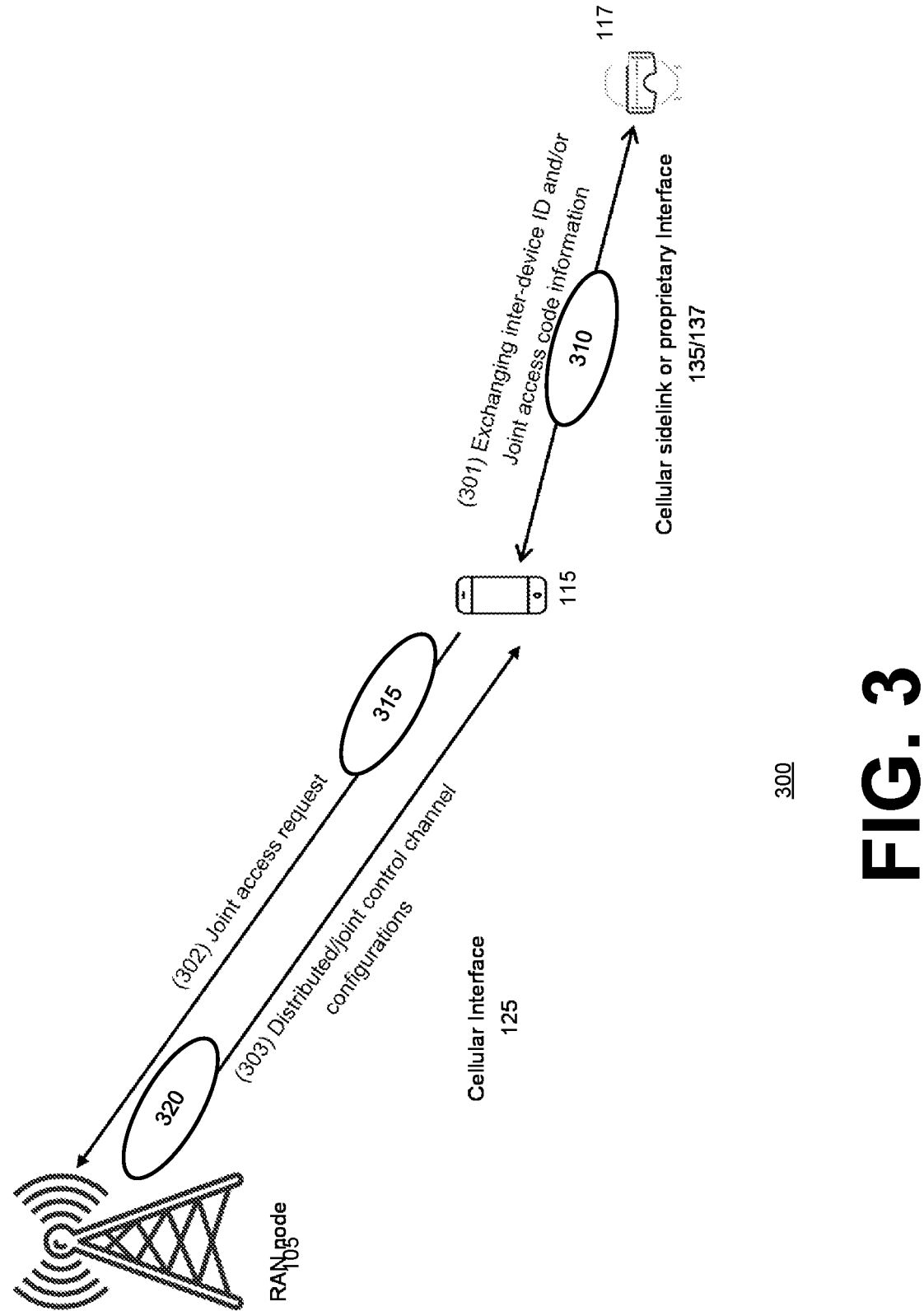
FIG. 3 illustrates an environment with an extended reality processing unit configured to perform RAN-node-related/radio-related functions.

Turning now to FIG. 3, the figure illustrates environment 300 in which radio UE 115 may be configured to use downlink control channel resources that may also be usable by end XR appliance 117. UE 115 may be referred to as a central XR processing unit, an intermediate XR processing unit, an XR processing unit, or a processing unit, and may facilitate one or more radio functions, or functionality, with respect to XR appliance 117. Although only one end XR appliance 117 is shown, it will be appreciated that XR processing unit 115 may facilitate radio functions, or functionality with respect to more than one XR appliance 117. Furthermore, XR processing unit 115 and end XR appliance (s) 117 may be treated as a group of user equipment by radio access network node 105.

At act 301, processing unit 115 may receive from one or more end XR appliance(s) 117 identifier or access code information corresponding to the appliance(s), and the appliance(s) may receive identifier and access code information from the processing unit. The identifier and access code information may be referred to as joint access information and may be shared among appliance(s) 117 and processing unit 115 via joint access request message 310. Joint access request message 310 may comprise a capability indication or access code corresponding to a joint/distributed control channel decoding, or one or more device identifiers for distributed control channel decoding. At act 302, processing unit 115 may transmit, or forward, the joint access information to radio access network node 105 via forwarded joint access request message 315. Responsive to receiving forwarded joint access request message 315, radio access network node 105 may facilitate transmitting to processing unit 115 distributed, or joint, downlink control channel configuration information via joint control channel configuration 320. Processing unit 115 and appliance(s) 117 may communicate via sidelink links 135 or other short range wireless communication links 137, for example Wi-Fi or Bluetooth links. Radio access network node 105 may communicate with XR processing unit 115 via long range wireless communication links 125. Radio access network node 105 may communicate with end XR appliance(s) 117 via long range wireless communication links 125.

XR processing unit 115 and the one or more end XR devices 117 in proximity with one another may share, determine, or otherwise coordinate synchronization of a unified access code or joint access code indication via one or messages 310. Exchange of one or more messages 310 may be facilitated by 5G sidelink links 135 or device-specific communication links 137. In an embodiment, a determined unified access code or indication can be pre-hardcoded on each device 115 or 117 by the devices' manufacturer(s) and thus may reduce or eliminate a number of messages 310 being exchanged. Thus, either a subset of, or all of, devices 115 or 117 of a group of user equipment may include a unified access code or indication as part of radio resource control ("RRC") connection establishment signaling toward serving RAN node 105. Upon receiving multiple connection establishment requests 315 from multiple devices indicating the same access code, RAN 105 node may consider that devices corresponding to transmission of message(s) 315 having the same access code effectively as a single device, with a single scrambling code usable for decoding scheduled downlink control channel search spaces. Thus, RAN node 105 may facilitate transmitting, or signaling, towards the one or more requesting devices 115 or 117, configuration(s) 320 corresponding to a distributed downlink control channel, wherein a message 320 may comprise control channel splitting information or control channel puncturing information.

Figure 4:
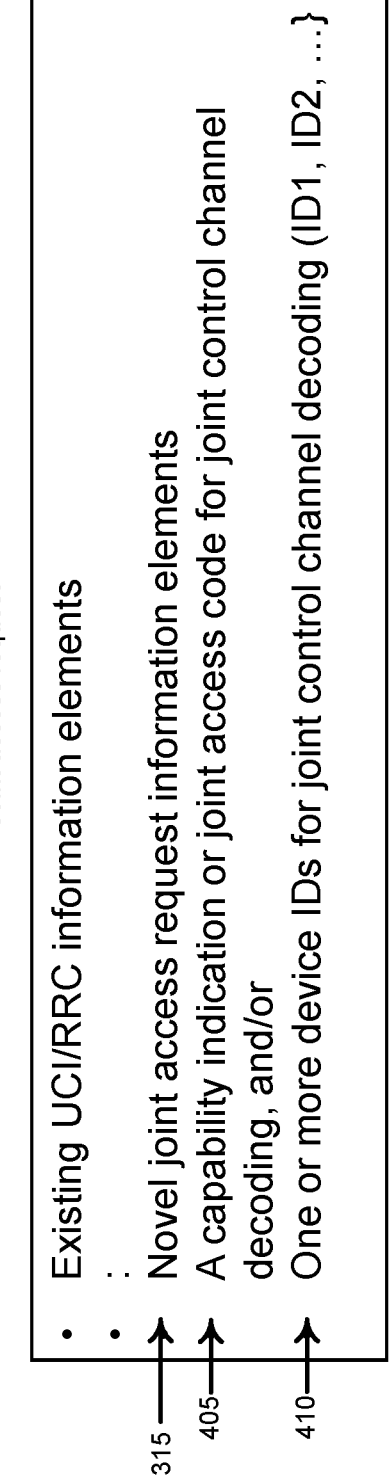
FIG. 4 illustrates an example message comprising a joint access request.

Turning now to FIG. 4, the figure illustrates an example uplink joint access request message information 315. Message 315 may be transmitted via an uplink message 400, which may be a control information ("UCI") message or an uplink RRC message. Message 315 information may comprise joint access code 405, or an indication of the capability to use a joint access code, that may facilitate pairing, or grouping, multiple accessing devices to be treated by a serving RAN as one device for certain purposes, for example connection establishment. Information contained in message 315 may comprise one or more device identifiers 410 corresponding to one or more devices (e.g., XR processing units or end XR appliances) that may be effectively represented by, correspond to, or be associated with an accessing device (e.g., an XR processing unit) that may transmit joint access information in joint access request message 315.

Turning now to FIG. 5, the figure illustrates an example joint control channel configuration 320, which may be transmitted from a serving RAN node to an intermediate XR processing unit via a downlink message 500, for example as a downlink control information message or an RRC message. Configuration information contained in configuration 320 may facilitate distributed control channel splitting. Information contained in configuration 320 may comprise resource information 510A or 510B corresponding to one or more downlink control channel search space(s). For example, configuration 320 may comprise information 510A corresponding to timing resource(s), frequency resource(s), or periodicity information associated with a search space A. Configuration 320 may comprise information 510B corresponding to timing resource(s), frequency resource(s), or periodicity information associated with a search space B. Resources corresponding to control search spaces A and B may partially, or fully, overlap, to result in a reduced overhead corresponding to the control channels associated with the control search spaces.

Configuration 320 may comprise scrambling code fields 515A and 515B that may contain scrambling codes that correspond to search spaces A and B (configured via information 510A and 510B), respectively. In an embodiment, wherein all monitoring devices (e.g., an XR processing unit and one or more end XR appliances 117) are treated effectively as a single device according to a joint access request message 315, a single scrambling code can be used by all participating devices to blindly decode a control search space. Configuration information 320 may comprise traffic information fields 520A or 520B. Traffic information fields 520 may comprise one or more downlink bearer identifiers, one or more QoS profile identifiers, or one or more flow identifiers. Downlink control information, corresponding to information contained in field(s) 520A or 520B, may be delivered via control search space(s) indicated in fields 505A or 505B, respectively, according to information contained in fields 515A or 515B, respectively. Thus, configuration 320 may facilitate one or more user equipment in monitoring and decoding search space A or search space B.

Figure 6:
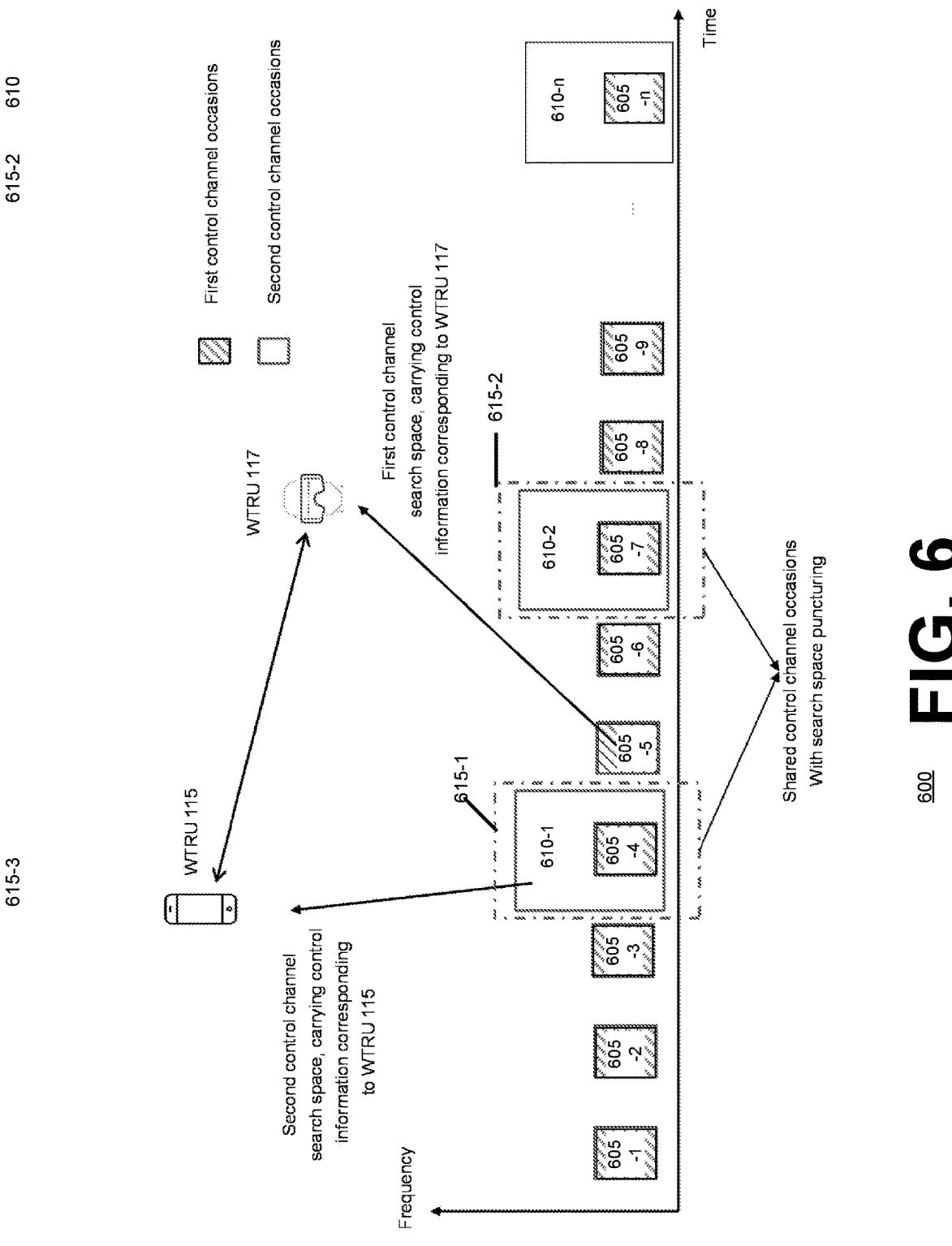
FIG. 6 illustrates an example control channel search space occasion arrangement with joint search space resource occasions.

Turning now to FIG. 6, the figure illustrates an overall setup 600 of an example splitting of a distributed control channel. A serving RAN node may configure two downlink control search spaces, each to be monitored and blindly decided by an XR devices, either using different scrambling codes or the same scrambling code. As shown in FIG. 6, larger second control channel search space occasions 610 may be monitored by a more capable XR processing unit. Decoding of control search space occasions 610 may facilitate receiving various control information directed either to the XR processing unit 115 or to one or more end XR appliances 117 associated with the XR processing unit via a joint access code. Smaller control search space occasions 605 may be conditionally monitored directly by end XR device(s) 117. Search space occasions 605 may carry latency stringent control information directly towards end XR device(s) 117 without involvement of XR processing unit 115. Bypassing processing unit 115 to deliver control traffic may be useful for very latency critical downlink traffic flows that cannot tolerate delay resulting from relaying control information and traffic by the processing unit. As shown in the figure, time or frequency resources corresponding to control channel search spaces 610 and 605 may be partially or fully overlapping to reduce control channel overhead. (Occasion 605-4 overlaps occasion 610-1 and occasion 605-7 overlaps 610-2.) In addition to facilitating reducing control channel resource overhead, overlapping of resources may facilitate puncturing.

Figure 7:
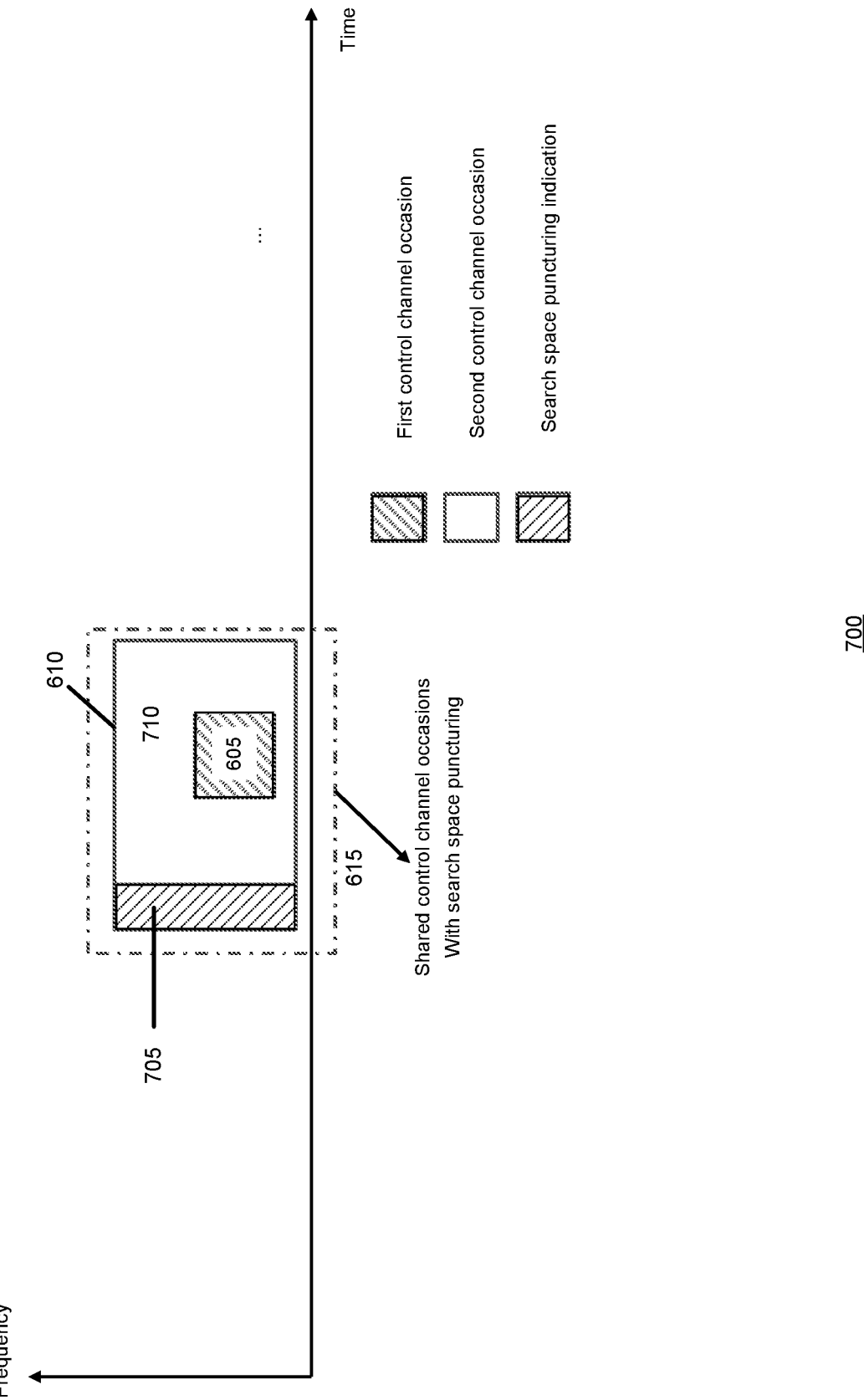
FIG. 7 illustrates an example punctured control channel search space resource occasion.

As shown in FIG. 7, a serving RAN node may dynamically (e.g., in real time) puncture larger control search space 610 with the smaller overlapped control search space 605. Resources 605 may be referred to as puncturing resources, or a puncturing search space, search space 610 may be referred to as a punctured search space, and the unpunctured part, or unpunctured parts, of the punctured search space may be referred to as a remnant search space, or remnant search spaces, 710. Thus, a RAN node may have determined a need for transmitting immediate control information via smaller search space 605, during resource-overlapping occasion 615, which smaller search space may be configured for decoding by a secondary user equipment/end XR appliance, instead of sending the control information via control search space 610, for which an XR processing unit may be configured to decode (via, for example configuration 320 described in reference to FIG. 5). Thus, instead of control information directed to an end XR appliance being delivered to an XR processing unit and relayed thereby to a target one or more end XR appliance(s), the control information may be delivered directly from the serving RAN to the end XR appliance. Delivery of the control information directed to the end XR appliance via puncturing resources 605 may be indicated by puncturing indication 705.

Continuing with description of FIG. 7, the serving RAN may determine and facilitate transmitting control channel puncturing indication 705, preceding, or at the beginning of, control channel search space 610 to indicate that search space 610 of current search space occasion 615 is to be shared to/punctured by smaller/overlapping search space(s) 605. The serving RAN may determine the remaining, or remnant, non-punctured resource set 710 of the current control search space 610. The serving RAN may determine a control message format and corresponding size that fits within the non-punctured resource set 710 of control channel search space 610. The serving RAN may segment and facilitate transmitting information directed to an XR processing unit according to the determined control channel message format via non-punctured/remnant control channel space 710.

Figure 8:
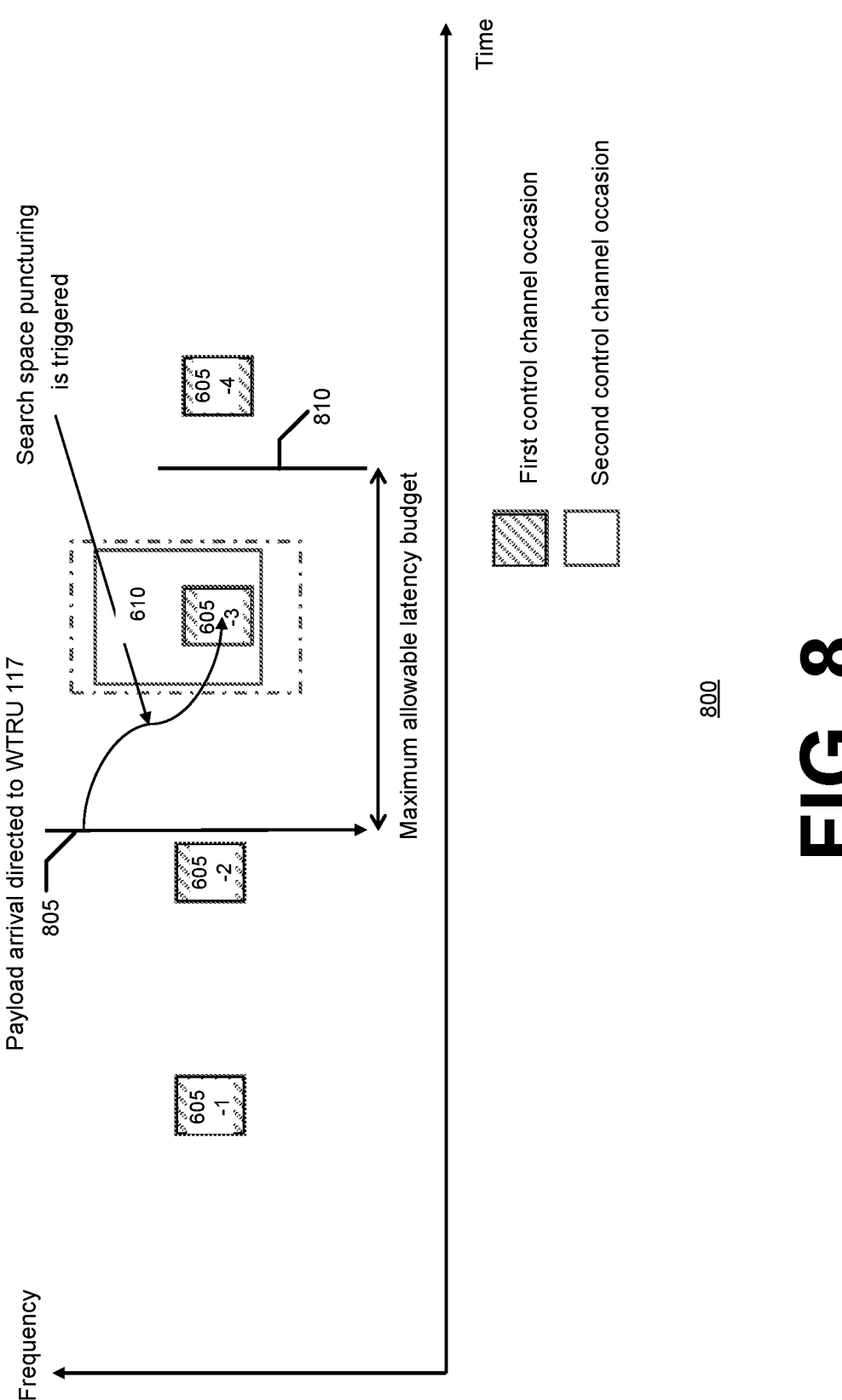
FIG. 8 illustrates an example determination to avoid a latency criterion violation by puncturing a joint search space resource occasion.

In an embodiment, as shown in FIG. 8, a serving RAN node may trigger puncturing of a primary control channel search space 610 (which may be referred to as second control channel search space or second control channel occasion), on condition of a stringent latency budget ending at budget ending time 810, associated with an incoming payload directed toward an end XR device being received at the RAN node at time 805, being violated if the RAN node waited to transmit scheduling information corresponding to a downlink control search space 605-4, which the end XR device may be configured to monitor. The RAN node may partially puncture or fully puncture, with search space resource 605-3, first available shared control channel search space 610, and immediately transmit corresponding control information directed to end XR appliance 117 via control channel search space 605-3 without incurring an extended buffering delay that would cause the control information to be transmitted via control channel search space 605-4 after end time 810. An indication of puncturing of shared control channel space 610 may facilitate the end XR appliance decode search space 605-3 during occasion 815, during which occasion the appliance would otherwise avoid decoding search space 605-3 due search space 610, which encompasses search space 605-3, being configured for decoding by the XR processing unit but for the indication of puncturing.

Figure 9:
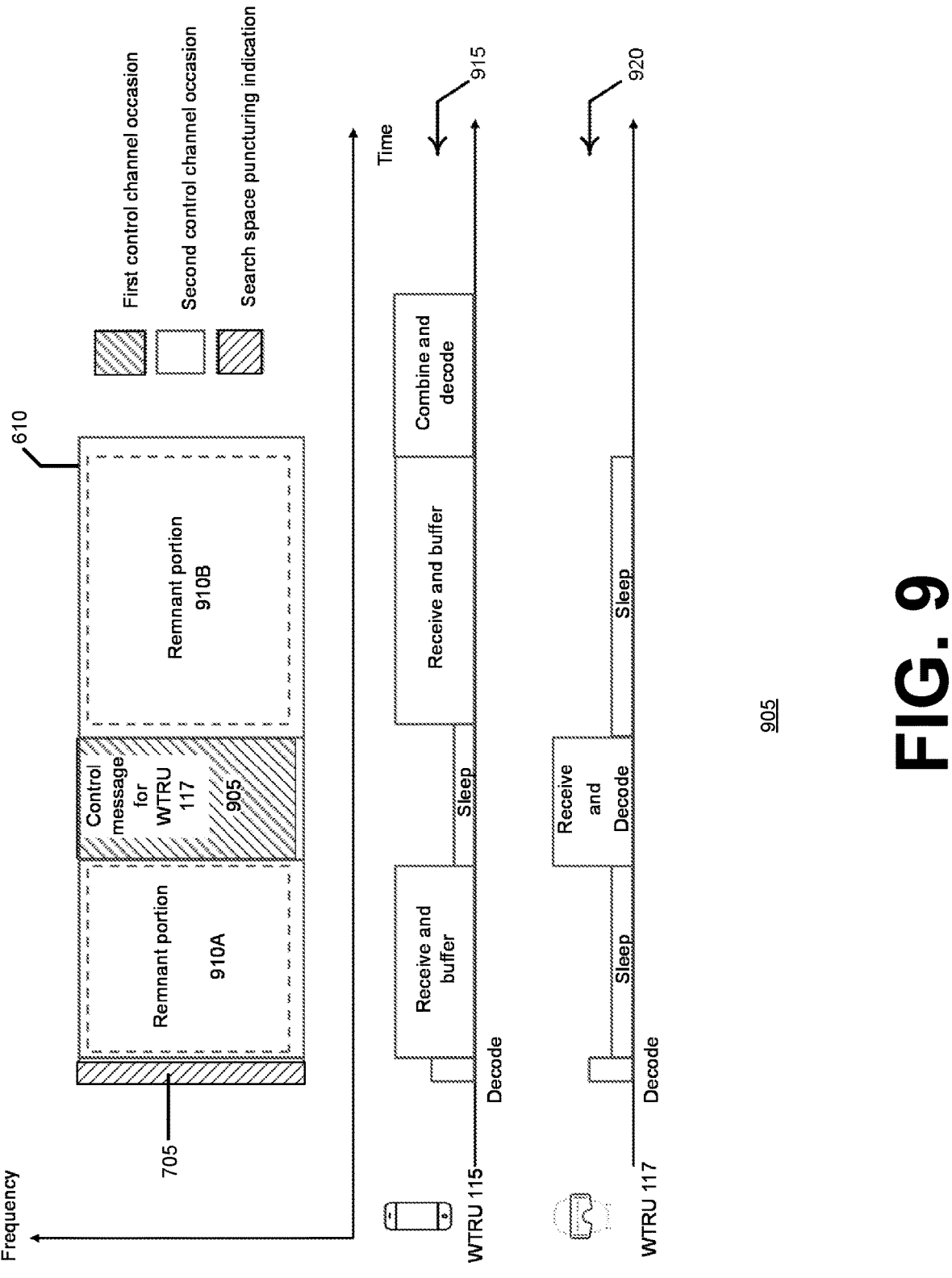
FIG. 9 illustrates example device behavior during a punctured joint search space resource occasion.

Accordingly, as shown in FIG. 9, during a shared downlink control channel search space 610, one or more end XR device(s) and an XR processing unit, that correspond to a joint access code, may determine the presence of control channel puncturing indication 705. Upon detecting punctuation indication 705, a puncturing end XR appliance 117 (e.g., an appliance to which a serving RAN node has determined control information should be directly transmitted) may determine one or more control search space(s) 905, which may have been configured for monitoring by the XR appliance via configuration 320 described in reference to FIG. 5, and which are puncturing space 610. Thus, according to decoding behavior 920, end XR appliance 117 may activate monitoring and blindly decoding determined control channel search space(s) 905, (e.g., puncturing indication 705 triggers control channel monitoring and decoding by the end XR appliance).

Upon detecting puncturing indication 705, punctured XR processing unit 115 (e.g., a serving RAN node has determined control information should be directly transmitted, using resources configured for monitoring by the XR processing unit, to XR end appliance 117) may receive and buffer control information/control message segments received via the non-punctured/remnant resources 910A or 910B of search space 610 remaining after puncturing. Accordingly, XR processing unit 115 may combine segments received via remnant portions 910A and 910B and attempt blind decoding of a control channel signaling format selected by the serving RAN to fit into the remnant portions. Accordingly, in the example shown in FIG. 9, due to the search space puncturing, punctured processing unit 115 may experience more processing load in decoding primary control channel 610 than if a more robust format, using all of resources 610, including puncturing resources 905, was used to transmit control information directed to the processing unit. Thus, puncturing shown in FIG. 9 may result in XR processing unit 115 receiving, buffering, combining, and finally blindly decoding received control channel signals/information (instead of just receiving and blindly decoding control information which may have been the case had control channel puncturing as shown in FIG. 9 not occurred).

Turning now to FIG. 10, the figure illustrates a timing diagram of an example embodiment method 1000. At act 1005, RAN node 105 may receive a joint (multi-device) access request message from one or more end XR appliance or from an XR processing unit corresponding to the one or more end XR appliance. The joint access request message, for example message 315 described in reference to FIG. 3, may comprise: a capability indication or joint access code indicative of, or usable for, joint/distributed control channel decoding; one or more device identifiers that are associated with one another at least by a common joint access code, usable for distributed control channel decoding. At act 1010, on condition of service being requested by a joint access request message, and based on radio requirements corresponding to the service being requested, RAN node 105 may determine: periodicity and frequency resource information (e.g., resources and respective resource size) of one or more joint control channel search spaces (e.g., second search space(s) 610 shown at least in FIG. 6 or search space(s) 605); one or more scrambling codes corresponding to the one or more joint control channel search space(s); or one or more downlink traffic flows or QoS profiles or bearers associated with each downlink channel search space. A first scrambling code may be associated with the first search space(s) 605 and a second scrambling code may be associated with the second search space(s) 610. At act 1015, RAN node 105 may transmit determined joint control channel configuration, for example configuration(s) 320 shown in FIG. 3 and described in reference to FIG. 5, towards XR end device(s) or an XR processing unit. At act 1020, on condition of an incoming traffic flow and/or a packet, which is associated with certain QoS profile and/or radio bearer destined for the end XR device, RAN node 105 may determine an associated, and first available, downlink control channel space (whether it will be monitored by an end XR appliance or an XR processing unit), according to downlink scheduling and control information corresponding to the device to which the traffic is directed, by adopting a scrambling code corresponding to the determined control search space.

At act 1030, on condition of RAN node 105 determining violation of a radio latency target corresponding to received traffic packet corresponding to an end XR appliance, (the violation being determined based on an assumption that control information corresponding to the being transmitted in a first available control channel search space corresponding to the XR appliance that does not overlap a search space corresponding to the XR processing unit), RAN node 105 may puncture a first available shared control channel search space (e.g., a search space that is configured for use by the processing unit that is coincident with a search space corresponding to the end XR appliance) with scheduling information or control information corresponding to the received packet via the smaller, secondary, control search space search space corresponding to the end XR appliance. At act 1035, RAN node 105 may transmit a control channel puncturing indication, indicating the first control space corresponding to the end XR appliance, partially or fully puncturing the second control search space configured for use by the XR processing unit. At act 1040, RAN node 105 may transmit dedicated (to the end XR appliance) control information signals via the punctured second search space/puncturing first search space.

Turning now to FIG. 11, the figure illustrates a timing diagram of an example embodiment method 1100. At act 1105, WTRU 115, which may be an XR processing unit, may transmit a joint (multi-device) access request message, towards RAN node 105, which request message may any of the following information elements: a capability indication or access code corresponding to joint/distributed control channel decoding, or one or more device identifiers corresponding to user equipment that are associated with respect to a common, or joint, access code, for distributed control channel decoding. At act 1110, WTRU 115 may receive a joint/distributed control channel configuration from serving RAN node 105. Based on information received in a joint/distributed control channel configuration, WTRU 115 may determine a downlink control occasions corresponding to the WTRU and respective scrambling coding, in addition to downlink control occasions corresponding to joint device/WTRUs (e.g., end XR appliances). On condition of a non-shared (e.g., device-dedicated) downlink control occasion, at act 1120 WTRU 115 may monitor and blindly decode the determined WTRU-specific downlink control occasion. At act 1125, on condition of a shared downlink control channel occasion, WTRU 115 may determine, or detect, the presence of a control channel puncturing indication. At act 1130, on condition of determining, at act 1125, a control channel puncturing indication being present in a control channel search space monitored at act 1120, WTRU 115 may determine the punctured control channel search sub-space, which may comprise search space resources configured for use by an end XR appliance. At act 1135, WTRU 115 may receive, buffer, combine, and blindly decode control information received via the non-punctured/remnant control channel search space, while avoiding monitoring the punctured control channel resources.

Figure 12:
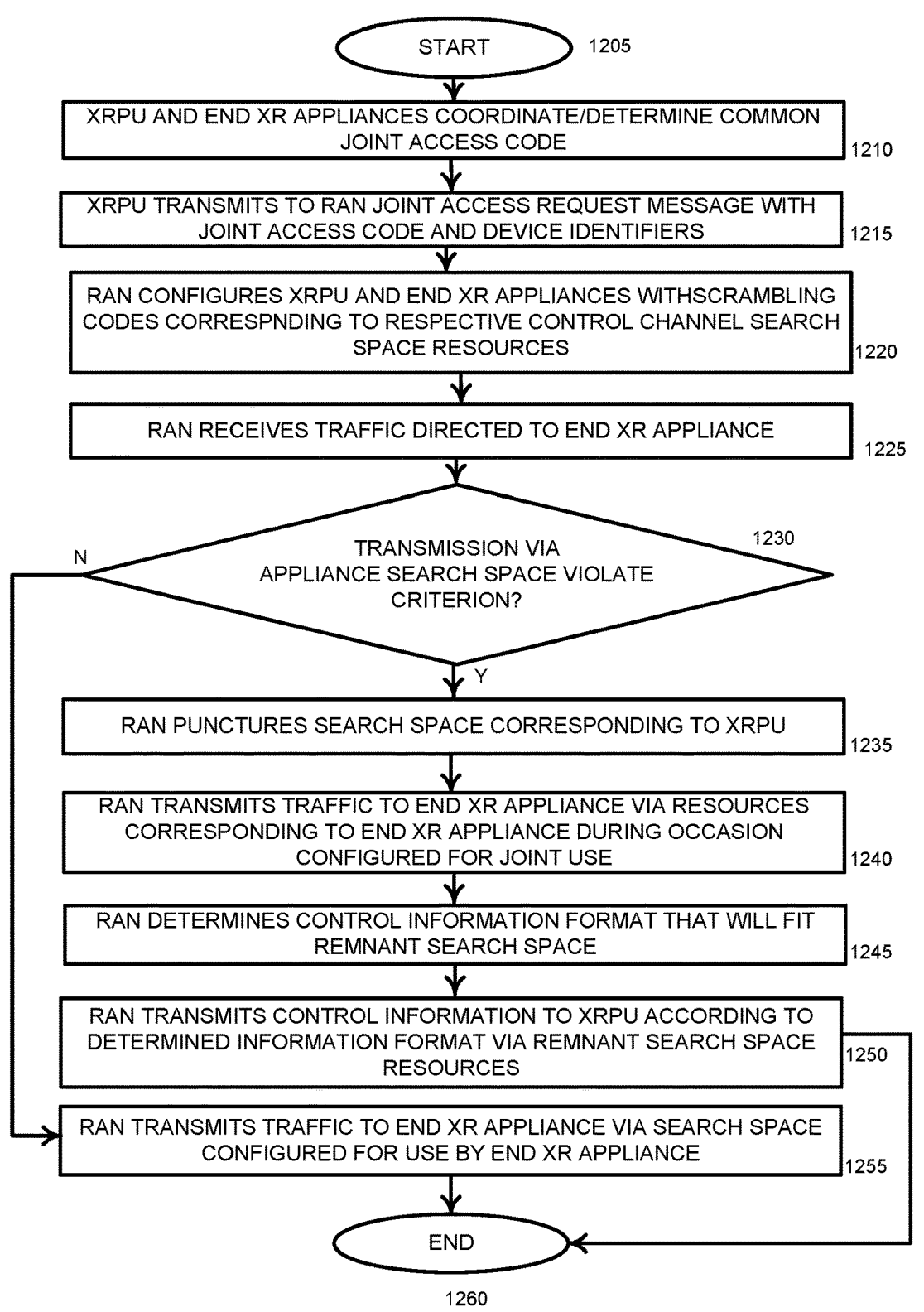
FIG. 12 illustrates a flow diagram of an example embodiment method.

Turning now to FIG. 12, the figure illustrates a flow diagram of an example embodiment 1200. Method 1200 begins at act 1205. At act 1210, an extended reality processing unit and end XR appliances may coordinate or determine a common joint access code. The joint access code may be configured into the XR appliances and the XR processing unit if the XR appliances and the XR processing unit or manufactured by the same manufacturer. If the joint access code is not already configured in the XR appliances and in the XR processing unit, the appliances and processing unit may coordinate and arrive at an agreed upon joint access code.

At act 1215, the extended reality processing unit may transmit to a radio access network node a joint access request message that may comprise the agreed upon joint access code and device identifiers corresponding to the XR processing unit and the end XR appliances that coordinated and agreed upon the joint access code.

At act 1220, responsive to receiving the joint access request, the radio access network node may configure the XR processing unit and the end XR appliances with scrambling codes corresponding to respective control channel search space resources associated with the XR processing unit and end XR appliances. In an embodiment, control channel search space resources configured as corresponding to end XR appliances may be referred to as first search space resources and a first scrambling code may be usable for decoding occasions corresponding to the first search space resources. Control channel search space resources configured as corresponding to the XR processing unit may be referred to as second search space resources and a second scrambling code may be usable for decoding occasions of the second search space resources. Due to processing capability of an XR appliance typically being less robust than processing capability of an XR processing unit, first control channel search space resources may be configured to occur more frequently than occurrences of the second controlled search space resources, but an individual occasion of the first controlled channel search space resources may comprise less frequency or time resources then second control channel search space resources. For example, a first control channel search space resource set 605 may be smaller with respect to a second control channel search space resource set 610 on a frequency versus time graph as shown in FIG. 6. Although an occasion of the first control channel search space resources may comprise fewer frequency or time resources than an occasion corresponding to the second control channel search space resources, by being configured to occur more frequently the first control channel search space resources may facilitate low latency delivery of control channel information directed to an end XR appliance because delivery of the control channel information would not be relayed using a second control channel search space resource, for which the extended reality processing unit is configured to use, and thus would not be subject to delay resulting from the relaying.

At act 1225, the radio access network node may receive downlink traffic directed to an end XR appliance. At act 1230, the radio access network node may determine whether transmitting control information, corresponding to the traffic received that 1225, via a next occasion, or occurrence of a configured first control channel search space that occurs after a joint control channel search space occasion, for example after occasion 815 shown in FIG. 8, would violate a latency criterion corresponding to the traffic received at act 1225. If at act 1230 the radio access network node determines that transmission of control channel information to the XR appliance would not violate the latency criterion, at act 1255 the radio access network node may transmit control traffic corresponding to the traffic received at act 1225 to the end XR appliance, to which the traffic is directed, via a next first control channel search space configured for use by the end XR appliance that occurs after a next joint control channel search space occasion. For example, if transmission of control channel traffic to and end XR appliance 117 via first search space resource occasion 605-4, as shown in FIG. 8, would not result in a violation of a latency criterion corresponding to the traffic received at act 1225, the radio access network node may transmit the control channel traffic to the end XR appliance using first search space resource occasion 605-4, and method 1200 advances to act 1260 and ends.

If, however, the radio access network node determines at act 1230 that transmission of the control channel traffic corresponding to the traffic received at act 1225 via first control channel search space resource occasion 605-4 shown in FIG. 8 would result in a violation of a latency delay corresponding to the traffic received at act 1225, the radio access network node may determine at act 1235 to puncture second search space resources corresponding to the extended reality processing unit that occur during a joint, or shared, search space occasion, such as search space occasion 815 shown in FIG. 8.

At act 1240, the radio access network node may transmit the traffic received at act 1225 to the end XR appliance to which the traffic is directed via control channel search space resources corresponding to the end XR appliance that are scheduled to occur during a joint, or shared, search space occasion, for example the access network node may transmit the control channel information during first control channel search space resource occasion 605-3 during search space occasion 815 shown in FIG. 8.

At act 1245, the radio access network node may determine a control information format that will fit in remnant search space that remains of search space 610 after puncturing by resources corresponding to first control channel resource occasion 605-3 as shown in FIG. 8. Examples of remnant search space resources are shown in FIG. 9 as remnant portion 910A and remnant portion 910B. Continuing with description of FIG. 12, at act 1250, the radio access network node may transmit control information to the extended reality processing unit according to an information format determined at act 1245 via the remnant search space resources that are remaining after puncturing of a joint search space occasion. Method 1200 advances to act 1260 and ends.

Turning now to FIG. 13, the figure illustrates an example embodiment method 1300 comprising at block 1305 facilitating, by a radio access network node comprising a processor, receiving a connection establishment message comprising a unified access code corresponding to a primary user equipment and at least one secondary user equipment associated with the primary user equipment; at block 1310 facilitating, by the radio access network node, transmitting, to the primary user equipment, a downlink control channel configuration comprising at least one scrambling code usable by the primary user equipment and the at least one secondary user equipment to decode at least one downlink control channel resource indicated in the downlink control channel configuration; at block 1315 wherein the at least one downlink control channel resource comprises a first downlink control channel resource and a second downlink control channel resource, and the method further comprising at block 1320 facilitating, by the radio access network node via the second downlink control channel resource, transmitting a puncturing indication indicative that the second downlink control channel resource is to be punctured to result in a punctured second downlink control channel resource and a remnant second downlink control channel resource; and at block facilitating, by the radio access network node via the punctured second downlink control channel resource, transmitting downlink control channel information directed to at least one of the at least one secondary user equipment.

Turning now to FIG. 14, the figure illustrates an example radio access network node 1400, comprising at block 1405 a processor that facilitates operations that are configured to: receive a connection establishment message comprising a unified access code corresponding to an extended reality processing unit and at least one extended reality appliance associated with the extended reality processing unit; at block 1410 transmit, to the extended reality processing unit and to the at least one extended reality appliance, a downlink control channel configuration comprising at least one scrambling code usable by the extended reality processing unit and the at least one extended reality appliance to decode at least one downlink control channel resource indicated in the downlink control channel configuration; at block 1415 transmit downlink control channel information via the at least one downlink control channel resource; at block 1420 wherein the at least one downlink control channel resource comprises a first downlink control channel resource and a second downlink control channel resource, and wherein the operations are further configured to: transmit, via the second downlink control channel resource, a puncturing indication indicative that the second downlink control channel resource is to be punctured to result in a punctured second downlink control channel resource and a remnant second downlink control channel resource; and at block 1425 transmit, via the punctured second downlink control channel resource, downlink control channel information directed to at least one of the at least one secondary user equipment.

Turning now to FIG. 15, the figure illustrates a non-transitory machine-readable medium 1500 comprising at block 1505 executable instructions that, when executed by a processor of a radio access network node, facilitate performance of operations, comprising receiving a connection establishment message comprising a unified access code corresponding to a primary user equipment and at least one secondary user equipment associated with the primary user equipment; at act 1510 transmitting, to the primary user equipment and to the at least one secondary user equipment, a downlink control channel configuration comprising at least one scrambling code usable by the primary user equipment and the at least one secondary user equipment to decode a first downlink control channel resource and a second downlink control channel resource; at block 1515 receiving downlink traffic directed to the at least one of the at least one secondary user equipment; at block 1520 determining that a quality-of-service criterion corresponding to the downlink traffic is going to be violated as a result of determining that downlink control information corresponding to the downlink traffic is going to be transmitted to the at least one of the at least one secondary user equipment after a next second downlink control channel resource occasion to result in a determined potential quality-of-service criterion violation; at block 1525 based on the determined potential quality-of-service criterion violation, transmitting, via the second downlink control channel resource, a puncturing indication indicative that the second downlink control channel resource is to be punctured to result in a punctured second downlink control channel resource and a remnant second downlink control channel resource; at block 1530 transmitting, via the punctured second downlink control channel resource, downlink control channel information, corresponding to the downlink traffic, directed to at least one of the at least one secondary user equipment.

Figure 16:
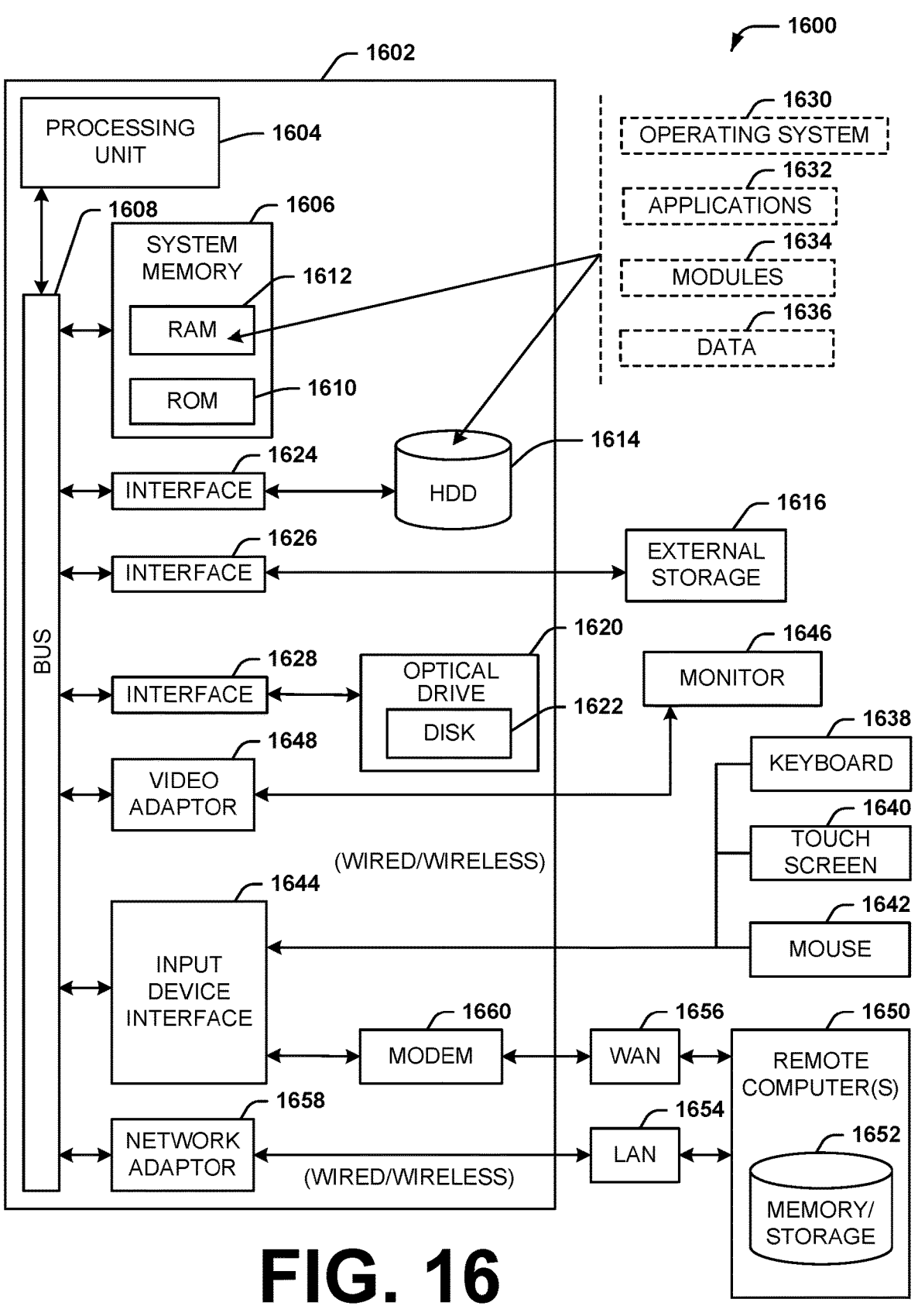
FIG. 16 illustrates an example computer environment.

In order to provide additional context for various embodiments described herein, FIG. 16 and the following discussion are intended to provide a brief, general description of a suitable computing environment 1600 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors and may include a cache memory. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

Computer 1602 further includes an internal hard disk drive (HDD) 1614 (e.g., EIDE, SATA), one or more external storage devices 1616 (e.g., a magnetic floppy disk drive (FDD), a memory stick or flash drive reader, a memory card reader, etc.) and an optical disk drive 1620 (e.g., which can read or write from disk 1622, for example a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid-state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can comprise a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are examples and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
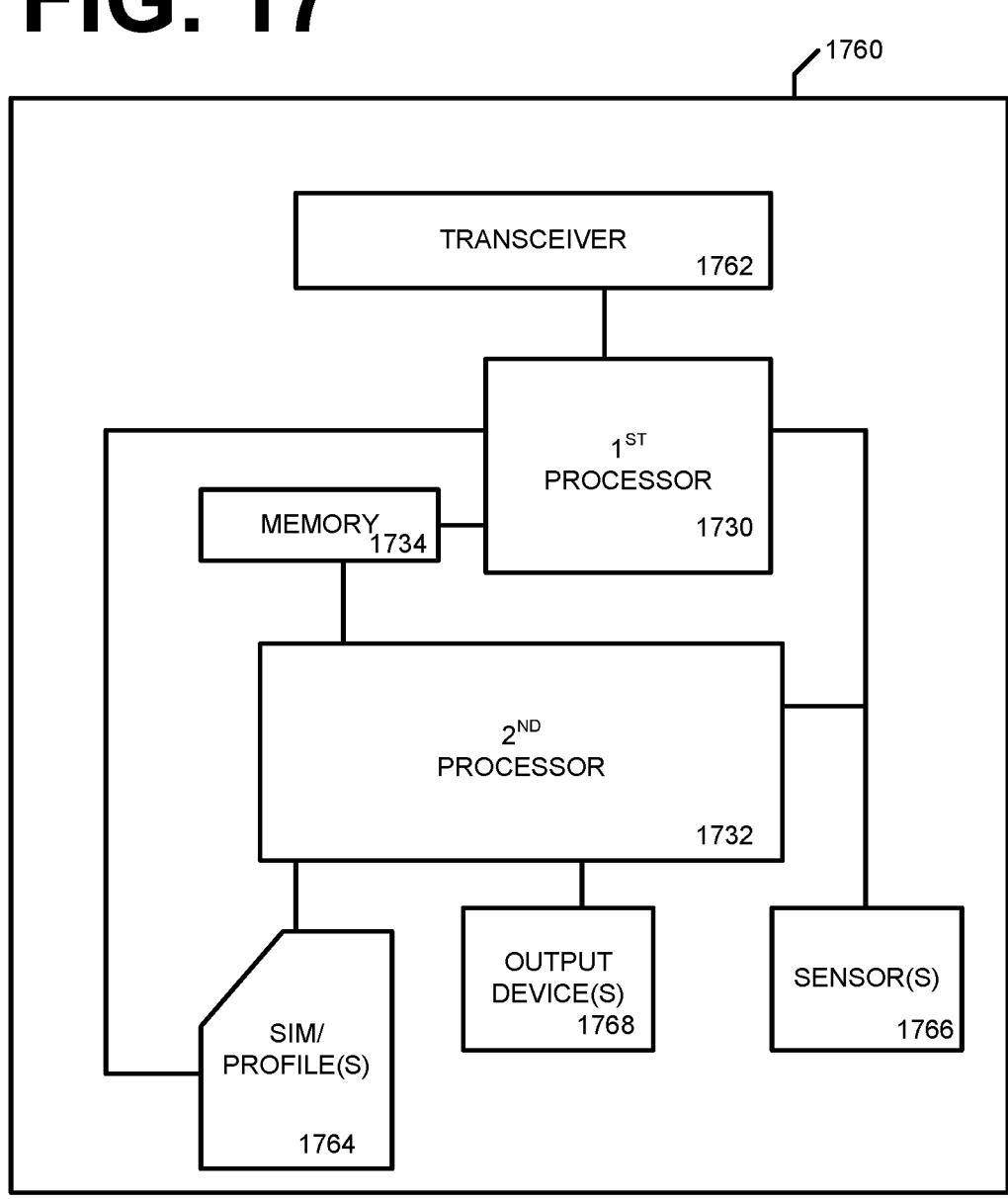
FIG. 17 illustrates a block diagram of an example wireless user equipment.

Turning now to FIG. 17, the figure illustrates a block diagram of an example UE 1760. UE 1760 may comprise a smart phone, a wireless tablet, a laptop computer with wireless capability, a wearable device, a machine device that may facilitate vehicle telematics, an intermediate XR processing unit, and the like. UE 1760 may comprise a first processor 1730, a second processor 1732, and a shared memory 1734. UE 1760 may include radio front end circuitry 1762, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1762 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 17, UE 1760 may also include a SIM 1764, or a SIM profile, which may comprise information stored in a memory (memory 1734 or a separate memory portion), for facilitating wireless communication with RAN 105 or core network 130 shown in FIG. 1. FIG. 17 shows SIM 1764 as a single component in the shape of a conventional SIM card, but it will be appreciated that SIM 1764 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1764 and another device, which may be a component of RAN 105 or core network 130 shown in FIG. 1). A SIM profile 1764 may also comprise identifying information that is unique to the SIM, or SIM profile, such as, for example, an International Mobile Subscriber Identity ("IMSI") or information that may make up an IMSI.

SIM 1764 is shown coupled to both first processor portion 1730 and second processor portion 1732. Such an implementation may provide an advantage that first processor portion 1730 may not need to request or receive information or data from SIM 1764 that second processor 1732 may request, thus eliminating the use of the first processor acting as a 'go-between' when the second processor uses information from the SIM in performing its functions and in executing applications. First processor 1730, which may be a modem processor or baseband processor, is shown smaller than processor second 1732, which may be a more sophisticated application processor than the first processor, to visually indicate the relative levels of sophistication (i.e., processing capability and performance) and corresponding relative levels of operating power consumption levels between the two processor portions. Keeping the second processor portion 1732 asleep/inactive/in a low power state when UE 1760 does not need the second processor for executing applications and processing data related to an application provides an advantage of reducing power consumption when the UE only needs to use the first processor portion 1730 while in listening mode for monitoring routine configured bearer management and mobility management/maintenance procedures, or for monitoring search spaces that the UE has been configured to monitor while the second processor portion remains inactive/asleep.

UE 1760 may also include sensors 1766, such as, for example, temperature sensors, accelerometers, gyroscopes, barometers, moisture sensors, light sensors, and the like that may provide signals to the first processor 1730 or second processor 1732. Output devices 1768 may comprise, for example, one or more visual displays (e.g., computer monitors, VR appliances, and the like), acoustic transducers, such as speakers or microphones, vibration components, and the like. Output devices 1768 may comprise software that interfaces with output devices, for example, visual displays, speakers, microphones, touch sensation devices, smell or taste devices, and the like, that are external to UE 1760.

The following glossary of terms given in Table 1 may apply to one or more descriptions of embodiments disclosed herein.

TABLE 1

| Term | Definition |
|------|------------|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio access network node comprising a processor, receiving a connection establishment message comprising a unified access code corresponding to a primary user equipment and at least one secondary user equipment associated with the primary user equipment;

facilitating, by the radio access network node, transmitting, to the primary user equipment, a downlink control channel configuration comprising at least one scrambling code usable by the primary user equipment and the at least one secondary user equipment to decode at least one downlink control channel resource indicated in the downlink control channel configuration, wherein the at least one downlink control channel resource comprises a first downlink control channel resource and a second downlink control channel resource, and wherein the method further comprises:

facilitating, by the radio access network node via the second downlink control channel resource, transmitting a puncturing indication indicative that the second downlink control channel resource is to be punctured to result in a punctured second downlink control channel resource and a remnant second downlink control channel resource; and facilitating, by the radio access network node via the punctured second downlink control channel resource, transmitting downlink control channel information directed to at least one of the at least one secondary user equipment.

2. The method of claim 1, further comprising:

facilitating, by the radio access network node, transmitting, to the at least one secondary user equipment, the downlink control channel configuration.

3. The method of claim 1, wherein the at least one scrambling code comprises a first scrambling code and a second scrambling code corresponding, respectively, to the first downlink control channel resource and the second downlink control channel resource, and wherein the first scrambling code is usable by the primary user equipment and the at least one secondary user equipment to decode the first downlink control channel resource.

4. The method of claim 1, wherein the puncturing indication comprises an indication that the second downlink control channel resource is to be punctured by the first downlink control channel resource to result in the punctured second downlink control channel resource and the first downlink control channel resource being the same.

5. The method of claim 1, wherein the puncturing indication comprises a puncturing resource indication indicative of the punctured second downlink control channel resource.

6. The method of claim 5, wherein the punctured second downlink control channel resource and the first downlink control channel resource are different.

7. The method of claim 1, wherein the at least one scrambling code comprises a first scrambling code and a second scrambling code corresponding, respectively, to the first downlink control channel resource and the second downlink control channel resource, wherein the first scrambling code is usable by the primary user equipment and the at least one secondary user equipment to decode the first downlink control channel resource, wherein the second scrambling code is usable by the primary user equipment to decode the second downlink control channel resource, and wherein the first scrambling code is usable by the at least one of the at least one secondary user equipment to decode the punctured second downlink control channel resource.

8. The method of claim 7, wherein the second scrambling code is exclusively usable by the primary user equipment to decode the second downlink control channel resource.

9. The method of claim 7, wherein the second scrambling code is usable by the primary user equipment and the at least one secondary user equipment to decode the puncturing indication.

10. The method of claim 1, wherein the at least one scrambling code comprises a same scrambling code usable by the primary user equipment and the at least one secondary user equipment to decode the first downlink control channel resource and the second downlink control channel resource.

11. The method of claim 1, wherein the second downlink control channel resource is a next second downlink control channel resource occasion, and the method further comprising:

facilitating, by the radio access network node, receiving downlink traffic directed to the at least one of the at least one secondary user equipment; and determining that a quality-of-service criterion corresponding to the downlink traffic will be violated as a result of transmission of downlink control information corresponding to the downlink traffic to the at least one of the at least one secondary user equipment after the next second downlink control channel resource occasion, the determining resulting in a determined potential quality-of-service criterion violation;

wherein the transmitting the puncturing indication is based on the determined potential quality-of-service criterion violation.

12. The method of claim 1, further comprising:

based on the remnant second downlink control channel resource, determining, by the radio access network node, a control channel message format that is able to be transmitted to the primary user equipment via the remnant second downlink control channel resource; and facilitating, by the radio access network node, transmitting downlink control channel information directed to the primary user equipment according to the control channel message format via the remnant second downlink control channel resource.

13. The method of claim 12, wherein the downlink control channel information comprises first downlink control information and second downlink control information, wherein the control channel message format comprises at least one first information format segment and at least one second information format segment, wherein the remnant second downlink control channel resource comprises a first remnant portion and a second remnant portion, and wherein the first downlink control information is transmitted according to the at least one first information formant segment via the first remnant portion and the second downlink control information is transmitted according to the at least one second information format segment via the second remnant portion.

14. A radio access network node, comprising at least one processor configured to process executable instructions that, when executed by the processor, facilitate performance of operations, comprising:

receiving a connection establishment message comprising a unified access code corresponding to an extended reality processing unit and at least one extended reality appliance associated with the extended reality processing unit;

transmitting, to the extended reality processing unit and to the at least one extended reality appliance, a downlink control channel configuration comprising at least one scrambling code usable by the extended reality processing unit and the at least one extended reality appliance to decode at least one downlink control channel resource indicated in the downlink control channel configuration;

transmitting downlink control channel information via the at least one downlink control channel resource, wherein the at least one downlink control channel resource comprises a first downlink control channel resource and a second downlink control channel resource, and wherein the operations further comprise:

transmitting, via the second downlink control channel resource, a puncturing indication indicative that the second downlink control channel resource is to be punctured to result in a punctured second downlink control channel resource and at least one remnant second downlink control channel resource; and transmitting, via the punctured second downlink control channel resource, downlink control channel information directed to at least one of the at least one secondary user equipment.

15. The radio access network node of claim 14, wherein the second downlink control channel resource to be punctured is a first second downlink control channel occasion, wherein a second second downlink control channel resource is a next second downlink control channel occasion with respect to the first second downlink control channel occasion, wherein the operations further comprise:

receiving downlink traffic directed to the at least one of the at least one secondary user equipment; and determining that a quality-of-service criterion corresponding to the downlink traffic will be violated, resulting in a determined potential quality-of-service criterion violation, based on a determination that downlink control information corresponding to the downlink traffic will be transmitted to the at least one of the at least one secondary user equipment after the next second downlink control channel resource occasion, wherein the puncturing indication is transmitted based on the determined potential quality-of-service criterion violation, and wherein the downlink control channel information corresponds to the downlink traffic.

16. The radio access network node of claim 14, wherein the operations further comprise, based on the at least one remnant second downlink control channel resource, determining at least one control channel message format that is able to be transmitted to the primary user equipment via the at least one remnant second downlink control channel resource; and facilitating, by the radio access network node, transmitting downlink control channel information directed to the primary user equipment according to the control channel message format via the at least one remnant second downlink control channel resource.

17. The radio access network node of claim 16, wherein the at least one remnant second downlink control channel resource comprises a first remnant second downlink control channel resource and a second remnant second downlink control channel resource, wherein the downlink control channel information comprises at least a first downlink control channel information segment and at least a second downlink control channel information segment, wherein the first downlink control channel information segment and the a second downlink control channel information segment are transmitted via the first remnant second downlink control channel resource and the second remnant second downlink control channel resource, respectively, and wherein the first downlink control channel information segment and the a second downlink control channel information segment are combinable by the primary user equipment.

18. A non-transitory machine-readable medium, comprising executable instructions that, when executed by a processor of a radio access network node, facilitate performance of operations, comprising:

receiving a connection establishment message comprising a unified access code corresponding to a primary user equipment and at least one secondary user equipment associated with the primary user equipment;

transmitting, to the primary user equipment and to the at least one secondary user equipment, a downlink control channel configuration comprising at least one scrambling code usable by the primary user equipment and the at least one secondary user equipment to decode a first downlink control channel resource and a second downlink control channel resource;

receiving downlink traffic directed to the at least one of the at least one secondary user equipment;

determining that a quality-of-service criterion corresponding to the downlink traffic is going to be violated as a result of determining that downlink control information corresponding to the downlink traffic is going to be transmitted to the at least one of the at least one secondary user equipment after a next second downlink control channel resource occasion to result in a determined potential quality-of-service criterion violation;

based on the determined potential quality-of-service criterion violation, transmitting, via the second downlink control channel resource, a puncturing indication indicative that the second downlink control channel resource is to be punctured to result in a punctured second downlink control channel resource and a remnant second downlink control channel resource; and transmitting, via the punctured second downlink control channel resource, downlink control channel information, corresponding to the downlink traffic, directed to at least one of the at least one secondary user equipment.

19. The non-transitory machine-readable medium of claim 18, the operations further comprising:

based on the remnant second downlink control channel resource, determining a control channel message format that is able to be transmitted to the primary user equipment via the remnant second downlink control channel resource; and transmitting downlink control channel information directed to the primary user equipment according to the control channel message format via the remnant second downlink control channel resource, wherein the downlink control channel information comprises first downlink control information and second downlink control information, wherein the control channel message format comprises at least one first information format segment and at least one second information format segment, wherein the remnant second downlink control channel resource comprises a first remnant portion and a second remnant portion, and wherein the first downlink control information is transmitted according to the at least one first information format segment via the first remnant portion and the second downlink control information is transmitted according to the at least one second information format segment via the second remnant portion.

20. The non-transitory machine-readable medium of claim 19, wherein the control channel message format is a revised control channel message format that is configured to accommodate less control information than a default control channel message format, wherein the second downlink control channel resource is configured to accommodate transmission of control information according to the default control channel message format, and wherein the remnant second downlink control channel resource is unable to accommodate transmission of control information according to the default control channel message format.

* * * * *